(12) United States Patent
Yao

(10) Patent No.: US 12,487,197 B2
(45) Date of Patent: Dec. 2, 2025

(54) SURFACE LOGGING WITH CUTTINGS-BASED ROCK PETROPHYSICS ANALYSIS

(71) Applicants: Baker Hughes Oilfield Operations LLC, Houston, TX (US); Yanhua Yao, Beijing (CN)

(72) Inventor: Yanhua Yao, Beijing (CN)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 120 days.

(21) Appl. No.: 17/908,052

(22) PCT Filed: Mar. 13, 2020

(86) PCT No.: PCT/CN2020/079208
§ 371 (c)(1),
(2) Date: Aug. 30, 2022

(87) PCT Pub. No.: WO2021/179288
PCT Pub. Date: Sep. 16, 2021

(65) Prior Publication Data
US 2023/0105670 A1    Apr. 6, 2023

(51) Int. Cl.
*E21B 49/00* (2006.01)
*G01N 23/207* (2018.01)
(Continued)

(52) U.S. Cl.
CPC ....... *G01N 23/2206* (2013.01); *E21B 49/005* (2013.01); *G01N 23/207* (2013.01); *G01N 23/223* (2013.01)

(58) Field of Classification Search
CPC ............. G01N 23/2206; G01N 23/207; G01N 23/223; E21B 49/005
See application file for complete search history.

(56) References Cited

U.S. PATENT DOCUMENTS

2014/0361466 A1* 12/2014 Kimour .................. G01N 33/24
264/496
2016/0146002 A1*  5/2016 Walls .................. G01N 21/718
702/9

(Continued)

FOREIGN PATENT DOCUMENTS

CN    102128845 A    7/2011
CN    106595764 A    4/2017
(Continued)

OTHER PUBLICATIONS

International Search Report, International Application No. PCT/CN2020/079208, Date of Mailing Nov. 30, 2020, National Intellectual Property Administration, PRC; International Search Report 5 pages.

(Continued)

*Primary Examiner* — David P Porta
*Assistant Examiner* — Mamadou Faye
(74) *Attorney, Agent, or Firm* — CANTOR COLBURN LLP

(57) ABSTRACT

Drilling process methods and systems for drilling are described. The methods include performing a drilling operation through a downhole formation, the drilling operation generating drilling cuttings. A single drilling cuttings sample is obtained at a surface-based location. X-ray diffraction (XRD) and/or x-ray fluorescence (XRF) analysis are performed on the single drilling cuttings sample. Element information and mineral information of the single drilling cuttings sample is obtained from the XRF analysis regarding the downhole formation. From the obtained information, a determination of at least one rock petrophysics property of the downhole formation is made.

18 Claims, 12 Drawing Sheets

(51) Int. Cl.
    *G01N 23/2206*     (2018.01)
    *G01N 23/223*     (2006.01)

(56) References Cited

U.S. PATENT DOCUMENTS

| | | | |
|---|---|---|---|
| 2017/0227450 A1* | 8/2017 | Hoegerl | G01V 20/00 |
| 2017/0235016 A1* | 8/2017 | Prioul | G01N 29/04 |
| | | | 73/152.01 |
| 2018/0100390 A1 | 4/2018 | Patil et al. | |
| 2018/0202264 A1* | 7/2018 | Sarduy | G06N 20/00 |
| 2018/0238774 A1 | 8/2018 | Amendt et al. | |

FOREIGN PATENT DOCUMENTS

| | | |
|---|---|---|
| CN | 107014844 A | 8/2017 |
| CN | 109844509 A | 6/2019 |
| CN | 110426505 A | 11/2019 |
| CN | 110530928 A | 12/2019 |
| WO | 2013155508 A1 | 10/2013 |

OTHER PUBLICATIONS

International Written Opinion, International Application No. PCT/CN2020/079208, Date of Mailing Nov. 30, 2020, National Intellectual Property Administration, PRC; International Written Opinion 3 pages.

Yao, Y. et al., "Successful Application of SEM-Based Formation Evaluations While Drilling", Australia School of Petroleum, University of Adelaide, Sep. 9, 2016, 1 page, Abstract only.

Yanhua, Yao et al., "Fracture Optimization Oriendtated Geosteering Within a Fracable Window can Improve Production Performance", IADC/SPE Asia Pacific Drilling Technology Conference, Society of Petroleum Engineers, Aug. 27-29, 2018, 17 pages.

\* cited by examiner

US 12,487,197 B2

SURFACE LOGGING WITH CUTTINGS-BASED ROCK PETROPHYSICS ANALYSIS

CROSS REFERENCE TO RELATED APPLICATIONS

This is a U.S. National Stage of PCT International Application No. PCT/CN2020/079208, filed on Mar. 13, 2020, the disclosure of which are incorporated herein by reference in its entirety.

BACKGROUND

1. Field of the Invention

The present invention generally relates to downhole operations and systems with surface logging employing cuttings-based rock petrophysics analysis.

2. Description of the Related Art

Boreholes are drilled deep into the earth for many applications such as carbon dioxide sequestration, hydrogen storage, geothermal production, and hydrocarbon exploration and production. In all of the applications, the boreholes are drilled such that they pass through or allow access to a material (e.g., a gas or fluid) contained in a formation (e.g., a compartment) located below the earth's surface. Different types of tools and instruments may be disposed in the boreholes to perform various tasks and measurements.

Various sensors may be used for logging and measurements during drilling operation (e.g., measurement-while-drilling and logging-while-drilling). Typically, such measurements are conducted downhole using wireline or while-drilling systems. Surface-based data typically is limited and may include surface-based x-ray diffraction (XRD) and x-ray fluorescence (XRF) analysis performed on cuttings to determine element and/or mineral data. Improved data collection and while-drilling analysis may be beneficial to the industry.

SUMMARY

Disclosed herein are systems and methods for surface-based rock petrophysics analysis during drilling operations. The drilling process methods include performing a drilling operation through a downhole formation, the drilling operation generating drilling cuttings, obtaining a single drilling cuttings sample at a surface-based location, performing x-ray diffraction (XRD) and x-ray fluorescence (XRF) analysis on the single drilling cuttings sample, obtaining element information of the single drilling cuttings sample from the XRF analysis regarding the downhole formation, obtaining mineral information of the single drilling cuttings sample from at least one of the XRD and the XRF analysis regarding the downhole formation, and determining at least one rock petrophysics property of the downhole formation from the element information and the mineral information.

Drilling systems in accordance with some embodiments include a drilling rig comprising a drill string having a bit on an end thereof for drilling a borehole through a formation, a surface-based cuttings collection device configured to obtain a single drilling cuttings sample, a cuttings analysis unit for performing at least one of x-ray diffraction (XRD) and x-ray fluorescence (XRF) analysis on the single drilling cuttings sample, and a processing system. The processing system is configured to obtain element information of the single drilling cuttings sample from the XRF analysis regarding the downhole formation, obtaining mineral information of the single drilling cuttings sample from at least one of the XRD and the XRF analysis regarding the downhole formation, and determining at least one rock petrophysics property of the downhole formation from the element information and the mineral information.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings, wherein like elements are numbered alike, in which:

DETAILED DESCRIPTION

Figure 1:
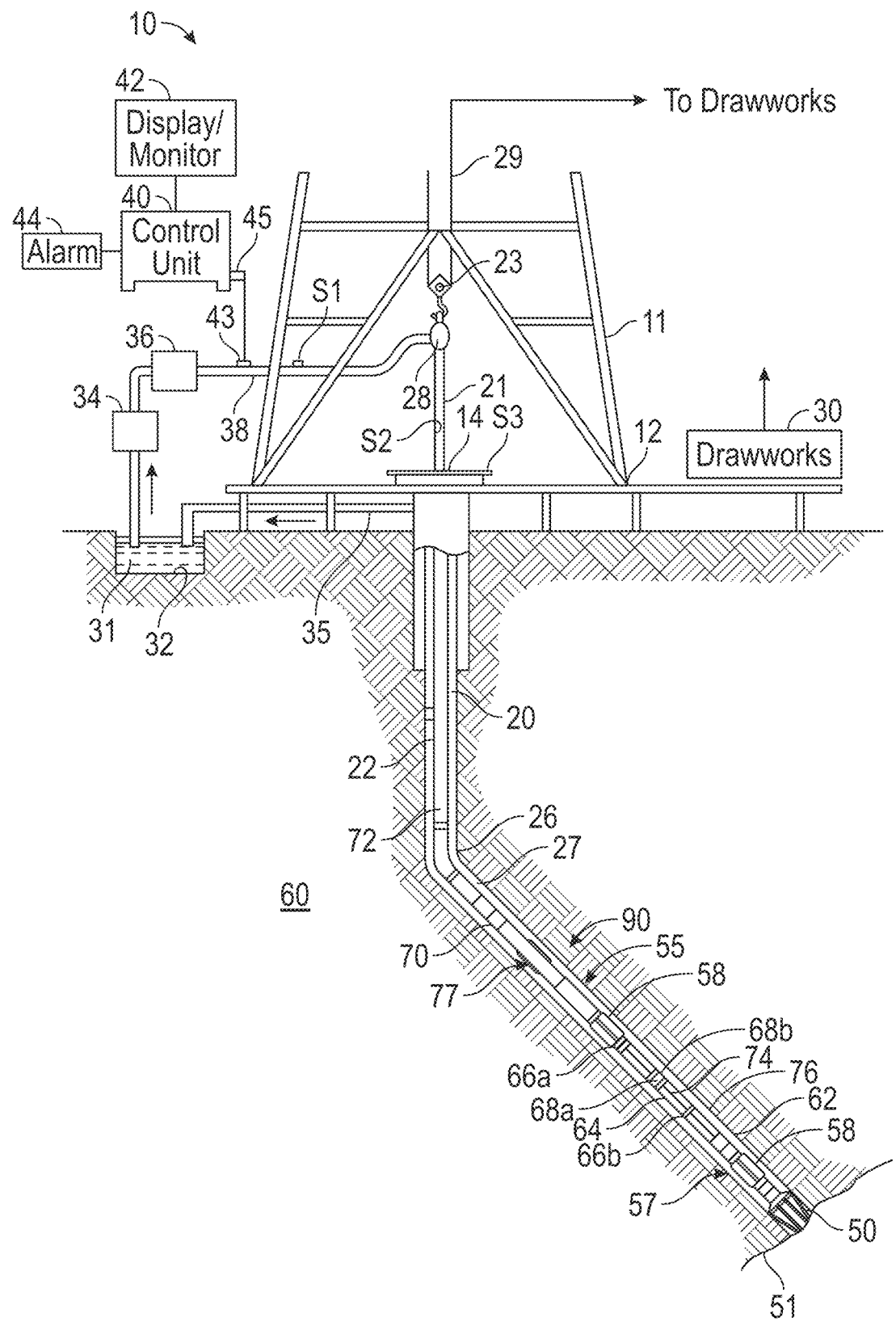
FIG. 1 is an example of a system for performing downhole operations that can employ embodiments of the present disclosure.

FIG. 1 shows a schematic diagram of a system for performing downhole operations. As shown, the system is a drilling system 10 that includes a drill string 20 having a drilling assembly 90, also referred to as a bottomhole assembly (BHA), conveyed in a borehole 26 penetrating an earth formation 60. The drilling system 10 includes a conventional derrick 11 erected on a floor 12 that supports a rotary table 14 that is rotated by a prime mover, such as an electric motor (not shown), at a desired rotational speed. The drill string 20 includes a drilling tubular 22, such as a drill pipe, extending downward from the rotary table 14 into the borehole 26. A disintegration device 50, such as a drill bit attached to the end of the BHA 90, disintegrates the geological formations when it is rotated to drill the borehole 26. The drill string 20 is coupled to surface equipment such as systems for lifting, rotating, and/or pushing, including, but not limited to, a drawworks 30 via a kelly joint 21, swivel 28 and line 29 through a pulley 23. In some embodiments, the surface equipment may include a top drive (not shown). During the drilling operations, the drawworks 30 is operated to control the weight on bit, which affects the rate of penetration. The operation of the drawworks 30 is well known in the art and is thus not described in detail herein.

During drilling operations a suitable drilling fluid 31 (also referred to as the "mud") from a source or mud pit 32 is circulated under pressure through the drill string 20 by a mud pump 34. The drilling fluid 31 passes into the drill string 20 via a desurger 36, fluid line 38 and the kelly joint 21. The drilling fluid 31 is discharged at the borehole bottom 51 through an opening in the disintegration device 50. The drilling fluid 31 circulates uphole through the annular space 27 between the drill string 20 and the borehole 26 and returns to the mud pit 32 via a return line 35. A sensor 51 in the fluid line 38 provides information about the fluid flow rate. A surface torque sensor S2 and a sensor S3 associated with the drill string 20 respectively provide information about the torque and the rotational speed of the drill string. Additional sensors may be configured at the surface (e.g., as part of the drilling system 10 and/or disposed downhole) and can include, without limitation, a gas tomographic sensor configured to monitor gas content and composition of the drilling fluid 31 while circulating the drilling fluid. Some such sensors may be configured with longer response times (minutes) than via detection using BHA embedded sensors and transmission via Electromagnetic Telemetry (seconds). Additionally, one or more sensors associated with line 29 are used to provide the hook load of the drill string 20 and about other desired parameters relating to the drilling of the borehole 26. The system may further include one or more downhole sensors 70 located on the drill string 20 and/or the BHA 90.

In some applications the disintegration device 50 is rotated by only rotating the drill pipe 22. However, in other applications, a drilling motor 55 (for example, a mud motor) disposed in the drilling assembly 90 is used to rotate the disintegration device 50 and/or to superimpose or supplement the rotation of the drill string 20. In either case, the rate of penetration (ROP) of the disintegration device 50 into the earth formation 60 for a given formation and a given drilling assembly largely depends upon the weight on bit and the drill bit rotational speed. In one aspect of the embodiment of FIG. 1, the drilling motor 55 is coupled to the disintegration device 50 via a drive shaft (not shown) disposed in a bearing assembly 57. The drilling motor 55 rotates the disintegration device 50 when the drilling fluid 31 passes through the drilling motor 55 under pressure. The bearing assembly 57 supports the radial and axial forces of the disintegration device 50, the downthrust of the drilling motor and the reactive upward loading from the applied weight on bit. Stabilizers 58 coupled to the bearing assembly 57 and/or other suitable locations act as centralizers for the drilling assembly 90 or portions thereof.

One or more surface control units 40 can be configured to receive signals from the downhole sensors 70 and devices via a transducer 43, such as a pressure transducer, placed in the fluid line 38, as well as from sensors 51, S2, S3 (and other surface sensors), hook load sensors, RPM sensors, torque sensors, downhole sensors, and any other sensors used in the system and processes such signals according to programmed instructions provided to the surface control units 40. The surface control units 40 can be configured to display desired drilling parameters and other information on one or more associated display/monitor 42 for use by an operator at the rig site to control the drilling operations. The surface control units 40 may include a computer, memory for storing data, computer programs, models and algorithms accessible to a processor in the computer, a recorder, such as tape unit, memory unit, etc. for recording data and other peripherals. The surface control units 40 also may include simulation models for use by the computer to processes data according to programmed instructions. The surface control units are configured to responds to user commands entered through a suitable device, such as a keyboard. The surface control units 40 can be configured to activate alarms 44 when certain unsafe or undesirable operating conditions occur.

The drilling assembly 90 also contains other sensors and devices or tools for providing a variety of measurements relating to the formation surrounding the borehole and for drilling the borehole 26 along a desired path. Such devices may include a device for measuring the formation resistivity near and/or in front of the drill bit, a gamma ray device for measuring the formation gamma ray intensity and devices for determining the inclination, azimuth and position of the drill string. A formation resistivity tool 64, made according an embodiment described herein may be coupled at any suitable location, including above a lower kick-off subassembly or steering unit 62, for estimating or determining the resistivity of the formation near or in front of the disintegration device 50 or at other suitable locations. An inclinometer 74 and a gamma ray device 76 may be suitably placed for respectively determining the inclination of the BHA and the formation gamma ray intensity. Any suitable inclinometer and gamma ray device may be utilized. In addition, an azimuth device (not shown), such as a magnetometer or a gyroscopic device, may be utilized to determine the drill string azimuth. Such devices are known in the art and therefore are not described in detail herein. In the above-described exemplary configuration, the drilling motor 55 transfers power to the disintegration device 50 via a shaft that also enables the drilling fluid to pass from the drilling motor 55 to the disintegration device 50. In an alternative embodiment of the drill string 20, the drilling motor 55 may be coupled below the resistivity measuring device 64 or at any other suitable place.

Still referring to FIG. 1, other logging-while-drilling (LWD) devices (generally denoted herein by numeral 77), such as devices for measuring formation porosity, permeability, density, rock properties, fluid properties, etc. may be placed at suitable locations in the drilling assembly 90 for providing information useful for evaluating the subsurface formations along borehole 26. Such devices may include, but are not limited to, temperature measurement tools, pressure measurement tools, borehole diameter measuring tools (e.g., a caliper), acoustic tools, nuclear tools, nuclear magnetic resonance tools and formation testing and sampling tools.

The above-noted devices transmit data to a downhole telemetry system 72, which in turn transmits the received data uphole to the surface control unit 40. The downhole telemetry system 72 also receives signals and data from the surface control unit 40 and transmits such received signals and data to the appropriate downhole devices. In one aspect, a mud pulse telemetry system may be used to communicate data between the downhole sensors 70 and devices and the surface equipment during drilling operations. A transducer 43 placed in the fluid line 38 (e.g., mud supply line) detects the mud pulses responsive to the data transmitted by the downhole telemetry system 72. Transducer 43 generates electrical signals in response to the mud pressure variations and transmits such signals via a conductor 45 to the surface control unit 40. In other aspects, any other suitable telemetry system may be used for two-way data communication (e.g., downlink and uplink) between the surface and the BHA 90, including but not limited to, an acoustic telemetry system, an electro-magnetic telemetry system, an optical telemetry system, a wired pipe telemetry system which may utilize wireless couplers or repeaters in the drill string or the borehole. The wired pipe telemetry system may be made up by joining drill pipe sections, wherein each pipe section includes a data communication link, such as a wire, that runs along the pipe. The data connection between the pipe sections may be made by any suitable method, including but not limited to, hard electrical or optical connections, induction, capacitive, resonant coupling, such as electromagnetic resonant coupling, or directional coupling methods. In case a coiled-tubing is used as the drill pipe 22, the data communication link may be run along a side of the coiled-tubing.

The drilling system described thus far relates to those drilling systems that utilize a drill pipe to convey the drilling assembly 90 into the borehole 26, wherein the weight on bit is controlled from the surface, typically by controlling the operation of the drawworks. However, a large number of the current drilling systems, especially for drilling highly deviated and horizontal boreholes, utilize coiled-tubing for conveying the drilling assembly downhole. In such application a thruster is sometimes deployed in the drill string to provide the desired force on the drill bit. Also, when coiled-tubing is utilized, the tubing is not rotated by a rotary table but instead it is injected into the borehole by a suitable injector while the downhole motor, such as drilling motor 55, rotates the disintegration device 50. For offshore drilling, an offshore rig or a vessel is used to support the drilling equipment, including the drill string.

Still referring to FIG. 1, a resistivity tool 64 may be provided that includes, for example, a plurality of antennas including, for example, transmitters 66*a* or 66*b* and/or receivers 68*a* or 68*b*. Resistivity can be one formation property that is of interest in making drilling decisions. Those of skill in the art will appreciate that other formation property tools can be employed with or in place of the resistivity tool 64.

Although FIG. 1 is shown and described with respect to a drilling operation, those of skill in the art will appreciate that similar configurations, albeit with different components, can be used for performing different downhole operations. For example, wireline, wired pipe, liner drilling, reaming, coiled tubing, and/or other configurations can be used as known in the art. Further, production configurations can be employed for extracting and/or injecting materials from/into earth formations. Thus, the present disclosure is not to be limited to drilling operations but can be employed for any appropriate or desired downhole operation(s).

During drilling operations, there may be difficulties in collecting and processing data related to downhole formations and properties thereof (e.g., rock petrophysics). Typically, wireline tools may be run through a borehole are used for formation analysis, such as rock properties and petrophysics. However, in soft and weak unconventional shale and high-pressure, high-temperature formations, data collection may be difficult. In such formations, because the formation is relatively weak, it may be difficult to run wireline tools into the formed borehole, and when running such wireline tools the risk is high for damage or collapse of the borehole. Furthermore, the soft/hazardous unconventional formations can make drilling complicated because during drilling operations active data collection and analysis may be insufficient to enable real-time, on-site decision making. Unconventional formation wells include, for example, shale wells, tight sandstone wells, high-pressure/high-temperature wells, carbonate wells, acidized wells, horizontal lateral wells, and other types of wells. Further, embodiments described herein may be applied to wells and drilling operations where wireline tools cannot be run and/or may be difficult or costly to run such wireline tools (e.g., wells having weak zones).

Various wireline tools may be insufficient and/or have drawbacks for making formation analysis. For example, a total-gamma-based tool can generate multiple results regarding a single formation, and thus prediction modeling based thereon can be uncertain and/or incomplete. In such data collection, a high gamma reading can indicate a high potassium and/or uranium content in a formation or rocks thereof, but such information is not indicative of rock strength and/or fracability, and thus can lead to uncertainties during drilling and/or fracturing operations. Further, the use of spectral gamma ray tools may not be feasible due to costs burdens and risks associated with deploying such tools into unconventional formations. Similarly, resistivity data may be impractical in tight and/or unconventional formations.

In view of this, embodiments of the present disclosure are directed to a cuttings-based approach for formation analysis (i.e., surface-based analysis). In accordance with some embodiments, a single XRF surface-based tool (x-ray fluorescence) or a single XRD surface-based tool (x-ray diffraction), or a combination of XRF and XRD surface-based tools may be employed to perform cuttings analysis to make determinations of downhole formations. A single XRF surface-based tool is able to quickly acquire element information from cuttings and such element information may be used to compute mineral and rock petrophysics data. Such process may be on the order of several minutes in total. The time spent for the data acquisition and analysis at the field (e.g., on site, at a well) is much shorter than single XRD approaches. For example, and XRF process may take on the order of about 3-7 minute, whereas an XRD process can take about 27-30 minutes. Typically XRD is only used to verify or confirm mineral output and analysis from XRF processes. As such, XRF processing and analysis is considered faster and more efficient than XRD processing.

The surface-based cuttings analysis, as disclosed herein, may be used for rock petrophysics analysis in both unconventional formations and conventional formations. Further, in some example configurations, such surface-based cuttings analysis as disclosed herein, may be used for deep wells having total vertical depth (TVD) of 6,000 meters or greater. In such deep wells, the use of logging-while-drilling (LWD) acquisition may be difficult or not able to be accessed because downhole temperatures/formation temperatures are too high for such while-drilling logging data acquisition.

The output from such surface-based cuttings analysis can be on par with downhole tools but provide for lower costs deployment, safer operations, and less risk to a hole, particularly in an unconventional formation. Furthermore, in addition to generating similar data to that of downhole wireline tools, the embodiments of the present disclosure can provide for rock petrophysics parameters and data related to a formation. For example, wireline elemental logging may be used to acquire element data and compute minerals, but is typically limited to about twenty elements and several minerals. In contrast, in accordance with some embodiments of the present disclosure, for example, thirty six (or more) elements and six to nine minerals may be identified, and additionally, rock petrophysical data may be obtained. It will be appreciated that embodiments of the present disclosure are not limited to thirty six element and six to nine minerals, but rather this example is merely to illustrate the improved quality and data output of embodiments of the present disclosure as compared to wireline data acquisition. Furthermore, because embodiments of the present disclosure are not equipment-dependent, various different standard or specific XRF data systems and equipment may be employed, which is in contrast to specifically configured downhole wireline tools that are configured for downhole environments.

In accordance with embodiments of the present disclosure, the surface-based cuttings analysis output can be used to optimize drilling programs and operations, analyze hole risks during drilling, evaluate downhole bit performance, and provide data for post-drilling operations, such as fracturing stages and perforations. By employing the surface-based cuttings analysis of the present disclosure, two general sets of data may be produced. Firstly, the surface-based cuttings analysis can provide an element/mineral data set based on XRF and/or XRD data, and secondly, petrophysics data may be produced. By using surface-based cuttings analysis employing XRF and/or XRD, element and mineral data may be obtained at the surface. This dataset is comparable to downhole wireline element/mineral datasets which require deployment of a downhole element logging tool.

From the element and mineral data, models of petrophysical data may be employed, when combined with cuttings data. Such petrophysical data includes, for example, density, rock strength, sonic travel time (delta time of compressional acoustic from sonic logs, hereinafter referred to as "DTC"), etc. Furthermore, in accordance with some embodiments, the surface-based cuttings analysis may be time-lag controlled such that depth data may be associated with the surface data. The surface-based cuttings analysis can provide for calibration between elemental logging and cuttings/coring and can be employed to develop three dimensional element mapping and/or cuttings-based modeling.

Embodiments described herein may be used to characterize formations and optimize drilling operations, optimize drilling fluids, optimize and/or analyze bit performance, and optimize post-drilling operations. Surface-based cuttings analysis of the present disclosure can provide petrophysics data including, but not limited to unconfined compressive strength, rock density, cuttings gamma, sonic travel time (DTC), concentration of organic material (TOC Index), brittleness index, mobile hydrocarbon index, caliper index, etc.

Due to the XRF and XRD technologies and processes for analyzing samples, the elements and minerals tested from one single cutting sample may be different from one testing time to another testing time. Additionally, the elements and minerals tested with different equipment on a single sample may be different. Thus, under prior systems and process, the data could not normalize to the well-data to enable building of a geological-model. For example, in some situations, three different types of XRF/XRD instruments may be used at a single drilling site. Even if the multiple different instruments were applied to a single test sample, different values (potentially large variance) may be found. Accordingly, downhole analysis may be done using wireline tools, which can potentially eliminate such disparity in surface-based data. A wireline elemental logging tool may be used for downhole data collection. However, there are potentially high costs (economically and/or associate with hole risks) associated with running such downhole wireline tools.

Embodiments of the present disclosure are directed to using a surface-based system to generate data that is analogous to downhole/wireline data. That is, high resolution and highly accurate surface-based data is used to output information that typically and historically has only been obtained using downhole (wireline) tools. Such data may be directly and accurately correlated to depth to provide additional comparison and viability as compared to a wireline dataset and/or logging-while-drilling dataset.

Figure 2:
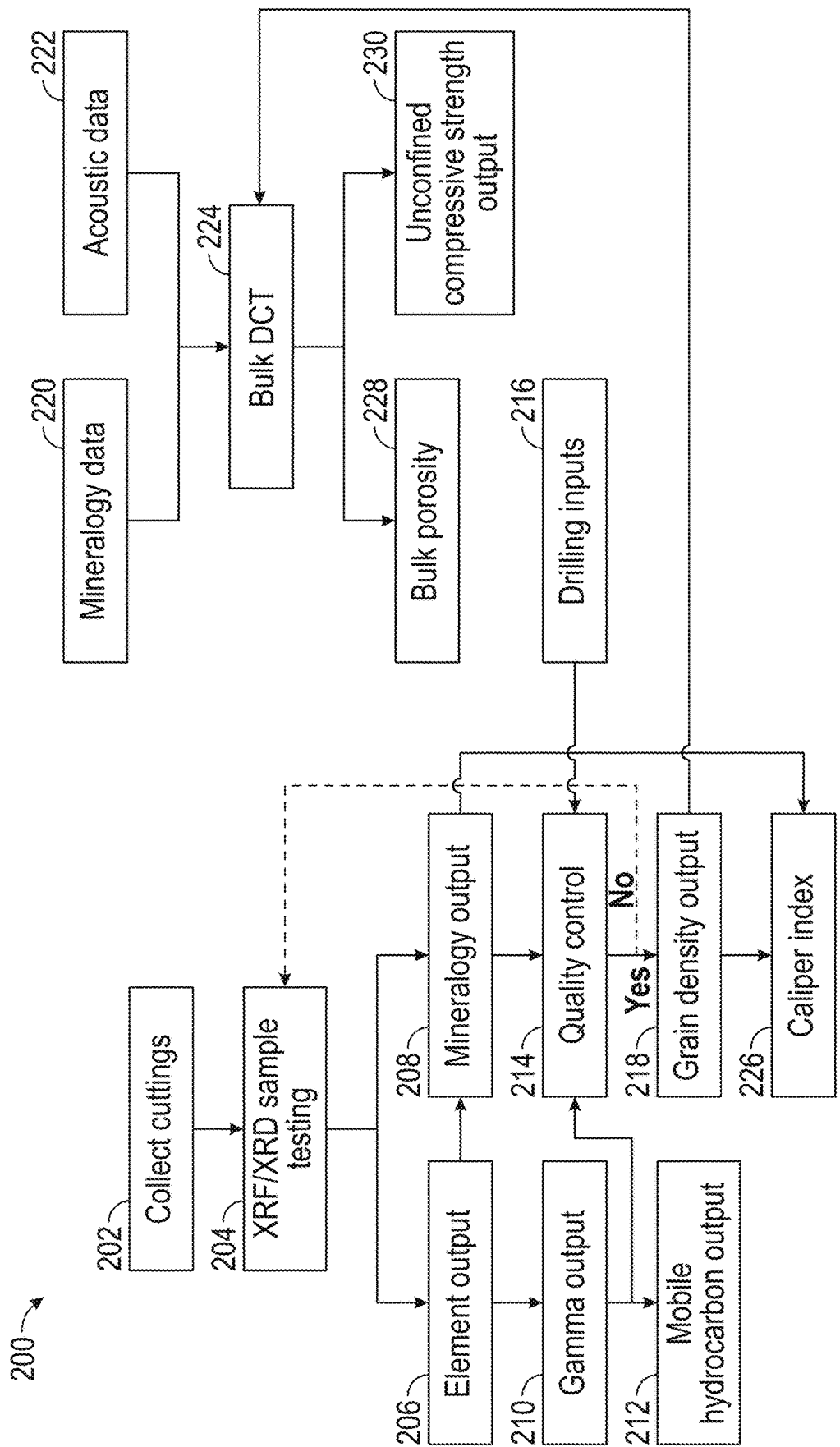
FIG. 2 is a flow process in accordance with an embodiment of the present disclosure.

Turning now to FIG. 2, a flow process 200 in accordance with an embodiment of the present disclosure is shown. The flow process 200 describes a workflow for extracting multiple different formation and downhole properties, characteristics, and/or parameters from analysis of drilling cuttings obtained at a surface location during a drilling operation. The flow process 200 is employed to extract additional information at the surface (surface logging), including one or more rock petrophysics properties, as described herein.

At block 202, drilling cuttings are obtained or collected. The drilling cuttings are obtained at a surface location during a drilling operation. The cuttings may be obtained from a cycled or pumped drilling fluid that is pumped downhole, drives operation of a cutting tool (e.g., drill bit) and flows back to the surface through an annulus of a borehole. The cuttings are formation or Earth material that is cut by the cutting tool and are removed by the fluid flow of the drilling fluid. As such, the returned or cycled drilling fluid will contain suspended material and cuttings when it is cycled back to the surface.

At block 204, a sample of the collected drilling cuttings can be tested using one or more types of sample testing. For example, in accordance with embodiments of the present disclosure, a single XRF surface-based tool (x-ray fluorescence), or a combination of XRF and XRD (x-ray diffraction) surface-based tools may be employed to perform cuttings analysis. The sample testing done at block 204 generates a first input for the workflow.

It is noted that the flow process 200 may be applicable and employed on a single cuttings sample. That is, only one same test is necessary to enable the following data extraction and outputs regarding downhole rock properties. Multiple sampling and testing is not required for performing the steps of flow process 200.

At block 206, from the cuttings analysis of block 204 (first input), a first output may be generated. The first output is an element output or element information, which can be obtained using XRF sample testing on the drilling cuttings. The element data of block 206 may be directly obtained from the XRF data using standard mineralogy data and calibration associated with the XRF instrument being used.

At block 208, the sample testing from block 204 (first input) may also generate a second output. The second output is a mineralogy output or mineral information from the drilling cuttings. The mineralogy output may be generated from XRF or XRD equipment sample testing and is a combination of the sample testing of block 204 and the element output of block 206. The mineralogy data of block 208 may be obtained using chemistry knowledge and elemental-based mineralogical models from elemental wireline logs. In accordance with some embodiments of the present disclosure, the mineralogy output at block 208 may be based, at least in part, upon correlations between certain elements and certain minerals, and using a correlation model.

The correlation model of minerals is derived from wireline element logs and/or from XRD lab-based data. The presence of various minerals in a given sample may be derived from the presence of one or more specific elements within the sample. The following are a few examples of such element-to-mineral derivation. Quartz is derived from the element silicon (Si) with a positive function. Feldspar is derived from the element sulfur (S). Calcite are derived from the element calcium (Ca). Dolomites are derived from the element magnesium (Mg). Pyrites are derived from the element barium (Ba). Kaolinites are a function of the elements aluminum (Al) and potassium (K). Illites are a function of the element magnesium (Mg). Chlorites have a function of the element iron (Fe). Smectics have a dominant function of iron (Fe) and aluminum (Al).

During an analysis, the sum total of the minerals will be equal to 100%. However, if it is determined that the total does not equal to 100%, then a total clay content is equal to 100%-Quartz-Feldspar-Calcites-Dolomites-Pyrites. In the following, the coefficients A, B, C, and D are derived from a local wireline element log, and thus different areas/regions or even different boreholes in the same field may have different coefficients. As such, the correlation model may be varied based on the local wireline elemental logs. However, example correlations of minerals to respective elements are as follows:

$$\text{Quartz} = A_{Quartz} * \text{Si} \quad (1)$$

$$\text{Feldspar} = A_{Feldspar} * S^3 - B_{Feldspar} * S^2 + C_{Feldspar} * S + D_{Feldspar} \quad (2)$$

$$\text{Calcites} = A_{Calcites} * \text{Ca} + B_{Calcites} \quad (3)$$

$$\text{Dolomites} = A_{Dolomites} * \text{Mg} + B_{Dolomites} \quad (4)$$

$$\text{Kaolinites} = A_{Kaolinites} * \text{Al} + B_{Kaolinites} * \text{K} \quad (5)$$

$$\text{Pyrites} = A_{Pyrites} * \text{Ba} + B_{Pyrites} * \text{Ba} + C_{Pyrites} \quad (6)$$

$$\text{Smectics} = -A_{Smectics} * \text{Fe} + B_{Smectics} * \text{Al} \quad (7)$$

$$\text{Chlorites} = -A_{Chlorites} * \text{Fe}^2 + B_{Chlorites} * \text{Fe} \quad (8)$$

$$\text{Illites} = A_{Illites} * \text{Mg} + B_{Illites} \quad (9)$$

From the first output (element output), at block 210, a third output may be computed. The third output is a cutting gamma. The third output of cutting gamma may receive, as input, specific element data (e.g., uranium, potassium, and thorium). The gamma output may be used to correct for well depth of all other data, thus ensuring a surface-based depth-correlated data analysis.

The cutting gamma may be obtained using the follow equation:

$$GR_{cutting} = A \frac{U_\% * U_r + Th_\% * Th_r + K_\% * K_r}{B * C} \quad (10)$$

wherein $GR_{cutting}$ is the cutting gamma output of block 210, U % is the percent of uranium within the sample, $U_r$ is the elemental radiation from uranium of the sample, Th % is the percent of thorium within the sample, $Th_r$ is the elemental radiation from thorium of the sample, K % is the percent of potassium within the sample, and $K_r$ is the elemental radiation from potassium of the sample. Further, in equation (10), A, B, and C are coefficients for determining gamma from cuttings data. The coefficients A, B, and C can be obtained from core data correlation. XRF data from a core can detect uranium (U) elemental radiation $U_r$, thorium (Th) elemental radiation $Th_r$, and potassium (K) elemental radiation $K_r$ and the percentages within the core (U %, Th %, K %). Data inputs from three testing points may be input into equation (10). From the three testing points, the values of the coefficients A, B, and C may be derived. Once the model is built, lab-based values/inputs of U %, Th %, K % may be replaced by cuttings-based data/values for U %, Th %, K %. As such, a model based on cuttings data can be achieved, and the lab-based data may be removed from the considerations.

The third output (cutting gamma) can be used to compute a fourth output at block 212. The fourth output is a cuttings-based Mobile Hydrocarbon measurement (Mobile HC). The determination of the fourth output, in addition to receiving the gamma data output from block 210, may also include logging-while-drilling gamma data. The cutting gamma always smaller than LWD gamma, the difference between the two is that cuttings sample is dry and washed without mobilable organic matter, whereas LWD gamma is a bulk (Total) gamma.

The Mobile Hydrocarbon (Mobile HC) may be obtained using the follow relationship:

$$\text{Mobile } HC = \text{IF}\left(\frac{GR_{LWD} - GR_{cutting}}{GR_{LWD}} < 0\right), 0, \left(\frac{GR_{LWD} - GR_{cutting}}{GR_{LWD}}\right)_\% \quad (11)$$

wherein $GR_{LWD}$ is a gamma output based on logging-while-drilling data and $GR_{cutting}$ is the gamma output from block 210. In some cases, when $GR_{LWD}$ may be equal to or smaller than $GR_{cutting}$, for example, $GR_{LWD}$ has shown invalid values measured by a wireline tool, then default value "0" could be assumed at the time. A comparison condition, "IF" in the model can control the result to be valid.

At block 214, the third output (gamma output), the second output (mineralogy output), and drilling inputs (block 216) are used for quality control and assessment. The drilling inputs (block 216) can include logging-while-drilling gamma information, rate of penetration information, torque information, pumping rate information, etc. (i.e., data and information directly associated with a drilling operation and/or downhole data). The quality control (block 214) can determine the validity of the data samples against downhole information and/or correlate such outputs (first, second, third, fourth outputs) with depth and/or depth intervals.

If it is determined that the data needs further refinement, the flow process 200 will return to block 204 to obtain additional sample testing on the drilling cuttings.

However, if it is determined that the data is sufficient and accurate at block 214, a fifth output may be generated at block 218. The fifth output is cuttings mineral-based density. The cuttings mineral-based density may be obtained using the following equation:

$$\rho_{cutting} = \frac{M_1 * \rho_1 + M_2 * \rho_2 + M_3 * \rho_3 \ldots M_n * \rho_n}{A} \quad (12)$$

where $\rho_{cutting}$ is the cuttings mineral-based density, $M_1$ is an amount of a first mineral within a sample, $\rho_1$ is a density of the first mineral, $M_2$ is an amount of a second mineral within a sample, $\rho_2$ is a density of the second mineral, $M_3$ is an amount of a third mineral within a sample, $\rho_3$ is a density of the third mineral, and $M_n$ is an amount of an nth mineral within a sample, and $\rho_n$ is a density of the nth mineral. In equation (3), the coefficient or constant A is a constant from 0 to 1. The constant A represents missing materials compared to a 100% density from a core sample. As such, the constant A is estimated by local experience and data, and may be based on local and/or regional formation data. For example, shale has a larger value than sandstone, as it is easier to lose rock materials when a mud logger prepares a cuttings sample from shale. The constant A may also be determined from core data and lithology. Typically, when using a mud logger, some materials and/or minerals may be missed during the preparation of a cuttings sample (e.g., by washing and grinding), but using the constant A in equation (12), more accurate results for the cuttings mineral-based density may be achieved.

The fifth output (density) may be combined with mineralogy data (block 220) and acoustic data (block 222) to generate a sixth output at block 224. The sixth output is cuttings-based bulk DTC (delta time of compressional acoustic—sonic log from cuttings, in μs/ft). The cuttings-based bulk DTC is a pseudo-value, derived from density as the input, which means some materials and/or minerals may be missed during the preparation of the cuttings samples. The cuttings-based bulk DTC represents a base level of DTC measured from the cuttings. This cuttings-based bulk DTC may be later re-calibrated by a local core. The mineralogy data at block 220 may be a second input into the flow process 200, and may be obtained using core (e.g., downhole) and/or lab-based data. The acoustic data at block 222 may be compressive acoustic data from cross-dipole wireline logs. As such, downhole, while-drilling data may be used in combination with the surface-based drilling cuttings data of the present disclosure to generate additional outputs that are indicative of downhole formation properties and characteristics.

The cuttings-based bulk DTC may be based, in part, on mineralogy density data. The relationship between density and DTC from Cross-dipole logs, and density can be derived from minerals, and used for a correlation model:

$$DTC_{bulk} = (-DTC_{index2}) * \rho_{cutting} * DTC_{index3} + DTC_{index1} \quad (13)$$

where $DTC_{bulk}$, is the bulk DTC, $\rho_{cutting}$ is the cuttings mineral-based density from the fifth output (which may be calibrated based on a core sample), and $DTC_{index1}$, $DTC_{index2}$, and $DTC_{index3}$ may be derived from the correlation model from cross-dipole logs. It will be appreciated that density may be obtained and/or derived from cross-dipole wireline logs. As such, the relationship between density and DTC may be built from cross-dipole wireline logs. Accordingly, the algorithm for DTC may be built using data from cross-dipole wireline logs. Mineral-based density as an input into the algorithm may generate DTC. Mineral-based DTC is a pseudo-value and may be calibrated by a core sample.

Furthermore, the fifth output (density) from block 218 and the second output (mineralogy output) from block 208 may be used to generate a seventh output at block 226. The seventh output is a caliper index. The caliper index (seventh output) may be based on mineralogy density and brittleness. The caliper is closely related to the density and brittleness, as the caliper is representative of a shape of the borehole which is based on a rock brittleness and the rock density. The caliper may be obtained based on the following equation:

$$C_{index} = \rho_{cutting} * \left( -\ln \frac{100-B}{B} \right) \quad (14)$$

where $C_{index}$ is the caliper index, $\rho_{cutting}$ is the cuttings mineral-based density (from block 218), and B is the brittleness. The caliper as an indicator of borehole shape (e.g., diameter along a length of the borehole), as used herein, is raw borehole shape, without reaming and tripping. Certain drilling engineering operations may change the original borehole shape (e.g., reaming, tripping, etc.). As used herein, the caliper refers to the original borehole shape. The borehole shape is determined, at least in part, by rock strength (e.g., the harder the rock, the more integrated the shape). Density plays an important role in rock strength, with density having a positive function with respect to rock strength. Furthermore, rock brittleness also plays a role in caliper. When rock is more brittle, the borehole shape may be more integrated because the formation may contain rich quartz and carbonates, which are brittle minerals. Such minerals (quartz, carbonates) typically have a relatively high density. When drilling shale, the borehole shape may be under gauged because the rock is relatively soft, with less brittleness and lower rock density. In view of this, the equation (14) is an empirical formula.

From the bulk DTC obtained at block 224, an eighth output (bulk porosity) is generated at block 228 and a ninth output (unconfined compressive strength) is generated at block 230.

The cuttings-based bulk porosity (block 228) may be obtained from the bulk DTC obtained at block 224, using the following equation:

$$\phi_{bulk} = \frac{DTC_{bulk} - DTC_{ma}}{DTC_w - DTC_{ma}} / KCP \quad (15)$$

where $\phi_{bulk}$ is the bulk porosity, $DTC_{bulk}$ is the cuttings-based bulk DTC obtained at block 224, $DTC_{ma}$ is a sonic log reading in 100% matrix rock and may be derived from a core test (e.g., typical sandstone DTC of a local sandstone formation), $DTC_w$ is a sonic log reading in 100% water, and KCP is a compaction factor (fractional). For sandstone, for example, the compaction factor KCP is 0.38, which is a known value associated with sandstone.

The unconfined compressive strength (block 230) may be obtained from the bulk DTC obtained at block 224, using the following equation:

$$UCS = 1.2 * \left( \frac{1000}{A * DTC_{bulk}} \right)^4 + 60.5 * \left( \frac{1000}{A * DTC_{bulk}} \right)^2 \quad (16)$$

Where UCS is the unconfined compressive strength, $DTC_{bulk}$ is the cuttings-based bulk porosity obtained at block 224, and A is a lithology code. The lithology code is a known value for various formations. For example, the sandstone lithology code is 1.67.

From the flow process 200, up to nine different formation rock-properties may be extracted, based on cuttings analysis using XRF and/or XRD of a single cuttings sample. As such, embodiments of the present disclosure are directed to a broad spectrum analysis of rock properties of essentially real-time analysis based on a single cuttings sample that is returned to the surface during a drilling operation. No additional downhole tools are needed, other than to potentially validate and/or improve data accuracy. Further, multiple separate samples are not required, and thus a relatively fast and safe mechanism to reliably generate rock petrophysic data is achieved. That is, at a broad level, embodiments of the present disclosure enable the extraction of downhole rock properties from cuttings analysis rather than relying on downhole analysis (e.g., cores, downhole wireline tools, etc.).

Figure 3:
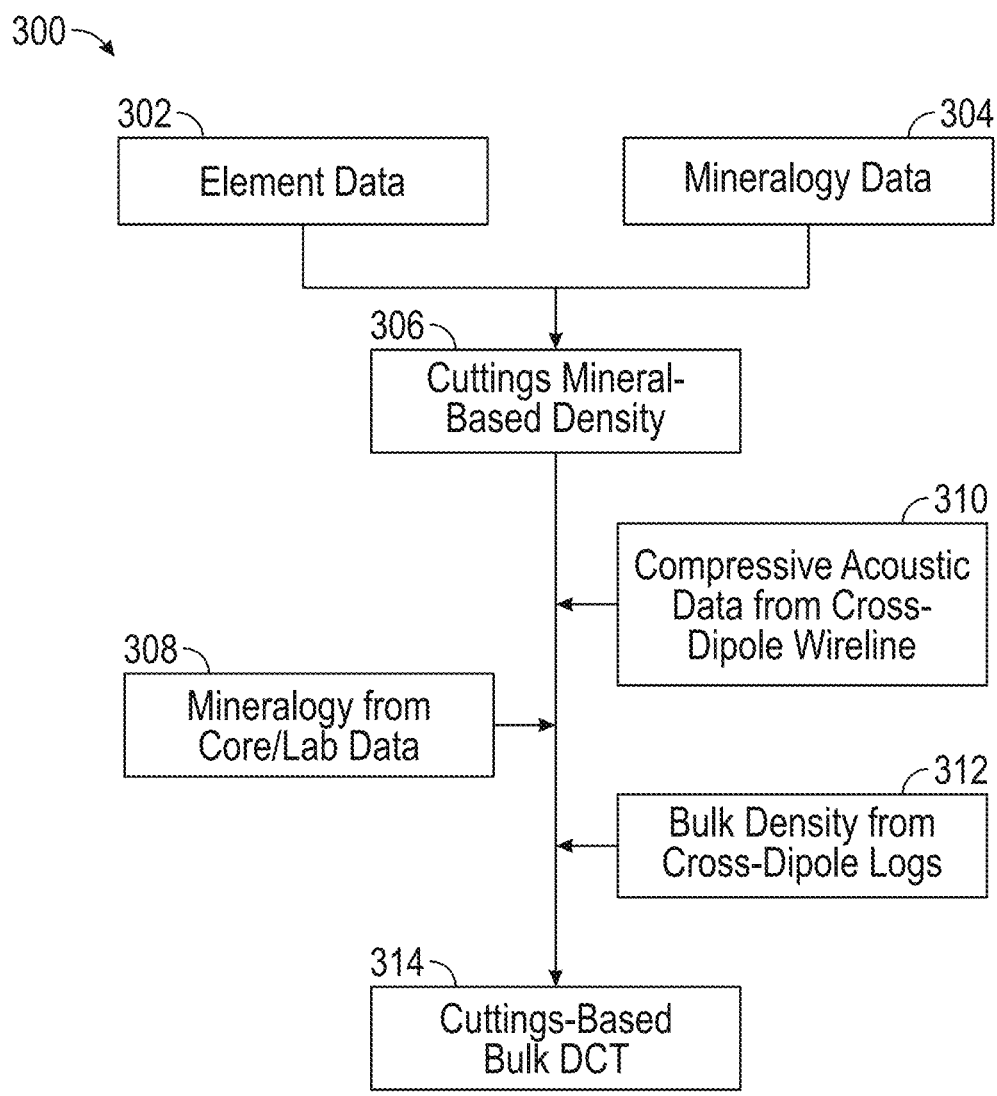
FIG. 3 is a flow process in accordance with an embodiment of the present disclosure.

Turning now to FIG. 3, a flow process 300 in accordance with an embodiment of the present disclosure is shown. The flow process 300 is a schematic flow process for generating two of the above described outputs in flow process 200 of FIG. 2. Specifically, flow process 300 illustrates the workflow for generating the fifth output (cuttings mineral-based density) and the sixth output (cuttings-based bulk DTC).

At block 302, element input data is obtained from a single cuttings sample using XRF. At block 304, mineralogy input data is obtained from a single cuttings sample using XRD.

At block 306, the element input data from block 302 and the mineralogy input data from block 304 are combined to generate cuttings mineral-based density, as discussed above.

The cuttings mineral-based density generated at block 306 is combined with mineralogy data from core samples and/or lab data (block 308), compressive acoustic data from cross-dipole wireline analysis (block 310), and bulk density from cross-dipole logs (block 312). The combined data can be used to output the cuttings-based bulk DTC at block 314.

In the flow process 300, it may be assumed that:

$$f(\rho_1) + f(\rho_2) + \ldots + f(\rho_n) = 100\% = \rho_{\frac{c}{w}} - \text{based} \quad (17)$$

$$\text{Rock Density} = \sum_{i=1}^{m} n + 1 \quad (18)$$

$$f(DTC_1)\% + f(DTC_2)\% + \ldots + f(DTC_n)\% = \quad (19)$$

$$DTC_{rock} = 100\% = DTC_{cd}$$

The cuttings-based bulk DTC is a pseudo value, derived from the sum of pseudo density from numbers of minerals as the input, which means some minerals may be missed during the preparation of the cuttings samples, resulting in the cuttings-based bulk DTC being a pseudo value. The cuttings-based bulk DTC represents a based level of DTC measured from the cuttings. Subsequently, the cuttings-based bulk DTC may be re-calibrated by local core data. In equations (17)-(19), when n is equal to a large number, this means the more minerals that one can derive from the elements, which means there is minimum loss of the materials during the preparation of a cuttings sample. And hence, the result (cutting-based density and cutting-based bulk DTC) may be closer to 100% of a real/actual DTC from wireline or core data. However, it is very difficult to achieve no loss during a sample preparation, therefore, a calibration from wireline cross-dipole logs may be employed to ensure cuttings-based data is accurate.

The outputs and data obtained through flow processes 200, 300, described above, may inform a downhole operator regarding downhole rock properties and petrophysics characteristics. Because the data can be obtained in substantially real-time, from cuttings during a drilling operation, and may be obtained at the surface, real-time decision making may be achieved.

For example, because the data may be on part with datasets typically associated with wireline tools, but no such tool is required, a faster and more efficient process is achieved. From the data obtained, modeling of downhole properties, parameters, and characteristics may be determined and action may be taken based thereon. For example, bit performance may be determined from the analysis and processes described above. By understanding downhole rock petrophysics in near real-time, an operator may select specific instruments and tools for use and/or data outputs can be normalized during drilling operations.

Furthermore, as noted above, the surface-based systems and processes described herein, enable expansion of prior XRF/XRD datasets. Typically, the XRF/XRD datasets are limited to elemental information and/or mineral information. However, advantageously, embodiments of the present disclosure expand this data to enable extraction of rock properties at the surface, in contrast to the conventional wireline (i.e., downhole) tools.

In execution, the flow processes described above employ XRF/XRD analysis of a single cuttings sample during an active drilling operation. The cuttings may be sampled at the surface and logged against lag time for depth. The XRF/XRD analysis is performed at the wellsite, yielding element and mineral composition. From the element and mineral composition, additional information may be obtained, as described above. Specifically, rock properties (e.g., petrophysics) may be obtained or estimated from the XRF/XRD element/mineral data. Such data can include, without limitations, feldspar data, quartz data, total clay, brittleness, rock density, DTC, unconfined compressive strength, TOC index, etc.

Figure 4:
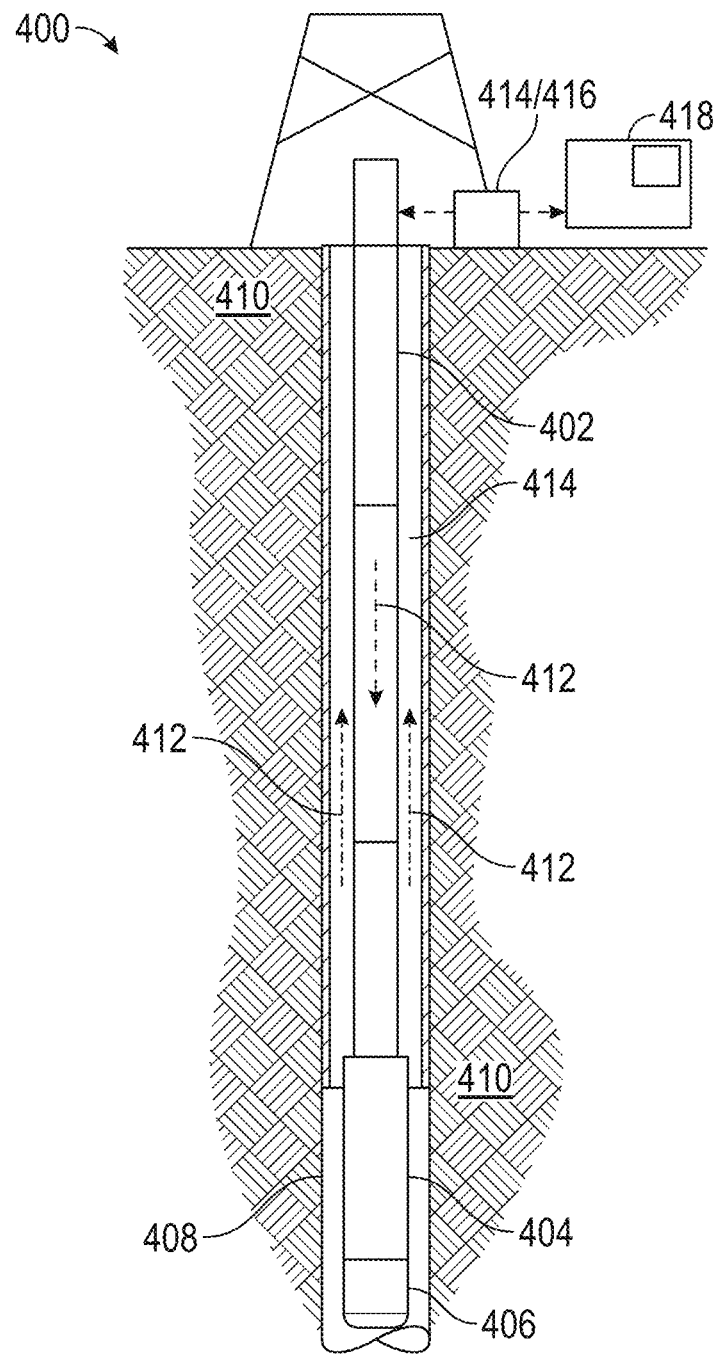
FIG. 4 is a schematic illustration of a drilling system that is configured to perform embodiments of the present disclosure.

Turning now to FIG. 4, a schematic illustration of a drilling system 400 that is configured to perform embodiments of the present disclosure is shown. The drilling system 400 includes a drill string 402 having a bottomhole assembly (BHA) 404 and a drill bit 406 on an end thereof. The drill string 402 and attached components are configured to drill a borehole 408 through a formation 410. During a drilling operation, drilling mud 412 is pumped downhole through the drill string 402 to the drill bit 406 to drive operation of the drill bit 406. The drilling mud 412 will flow through the drill bit 406 and into an annulus 414 of the borehole 408, and flow back to the surface. The drilling mud 412 will pick up material from the drilling operation and carry it to the surface (drilling cuttings).

At the surface, the drilling mud 412, with drilling cuttings, may be sampled using a surface-based cuttings collection device 414. The surface-based cuttings collection device 414 may be configured to obtain a single drilling cuttings sample. A cuttings analysis unit 416 is arranged to performing at least one of x-ray diffraction (XRD) and x-ray fluorescence (XRF) analysis on the single drilling cuttings sample. As shown, the surface-based cuttings collection device 414 and the cuttings analysis unit 416 are illustrated as a single unit/component. In alternative configurations, the surface-based cuttings collection device 414 and the cuttings analysis unit 416 may be separate and distinct units. For example, the cuttings analysis unit 416 may be a portable XRF system that is brought on-site to perform cuttings analysis, as described herein. A processing system 418 is in communication with one or both of the surface-based cuttings collection device 414 and the cuttings analysis unit 416. The processing system 418 may be configured to perform the processes described herein to enable petrophysics data extraction from cuttings at the surface. The processing system 418 may include a display to enable active plotting and display of the processed and extracted information, including the rock petrophysics data obtained in accordance with embodiments of the present disclosure. Given the active display, an operator may be able to actively monitor drilling events and information during an active drilling operation, and make live decisions based on the information displayed. The drilling events are actual facts that can be observed at the surface. As a part of information sources in accordance with embodiments of the present disclosure, the drilling events are important for field operators to justify the correction of the data interpreted from cuttings, and test if cuttings data is consistent with the actual events.

Figure 5A:
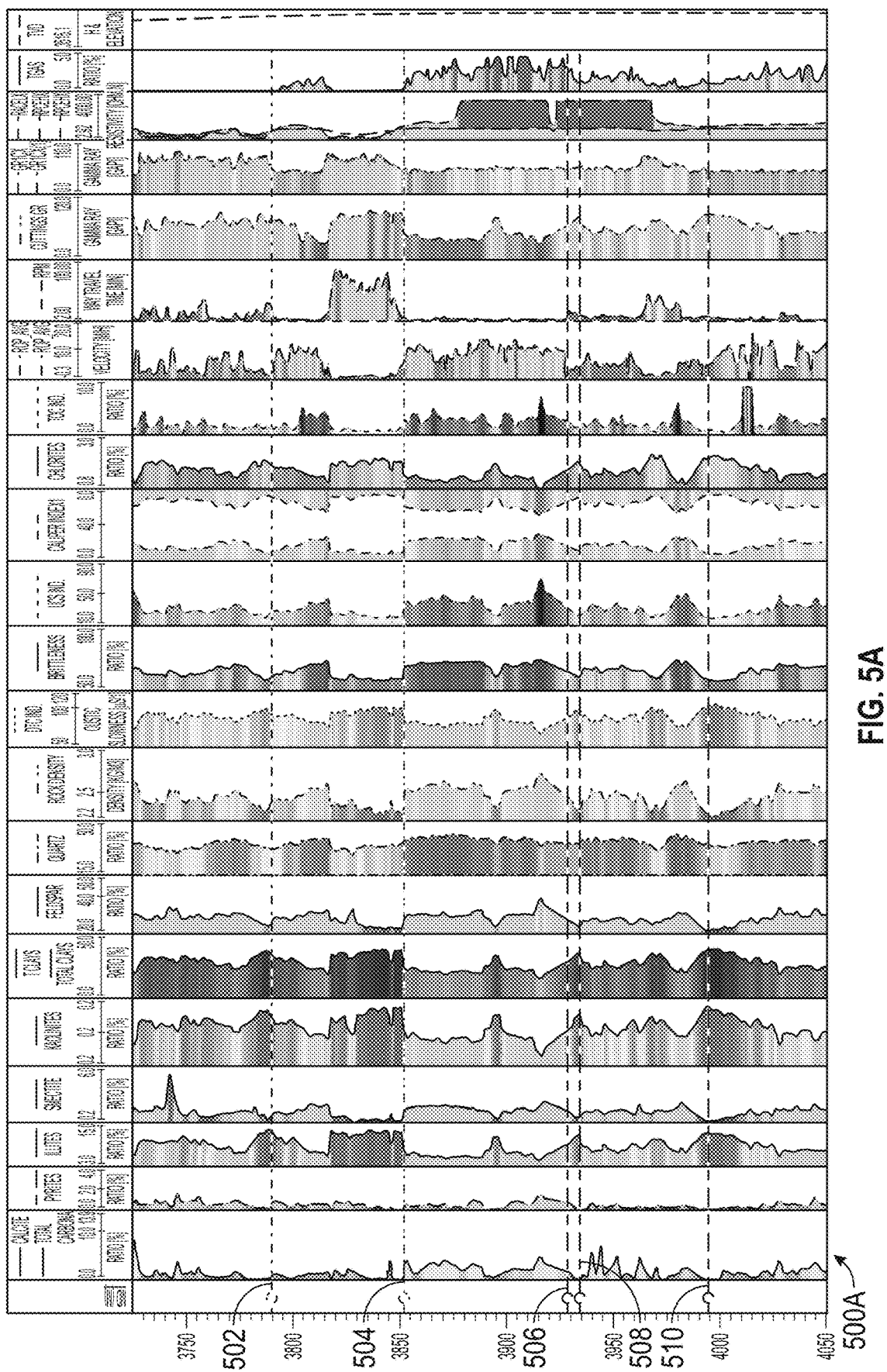
FIG. 5A is a schematic plot of displayed data obtained in accordance with an embodiment of the present disclosure.
Figure 5B:
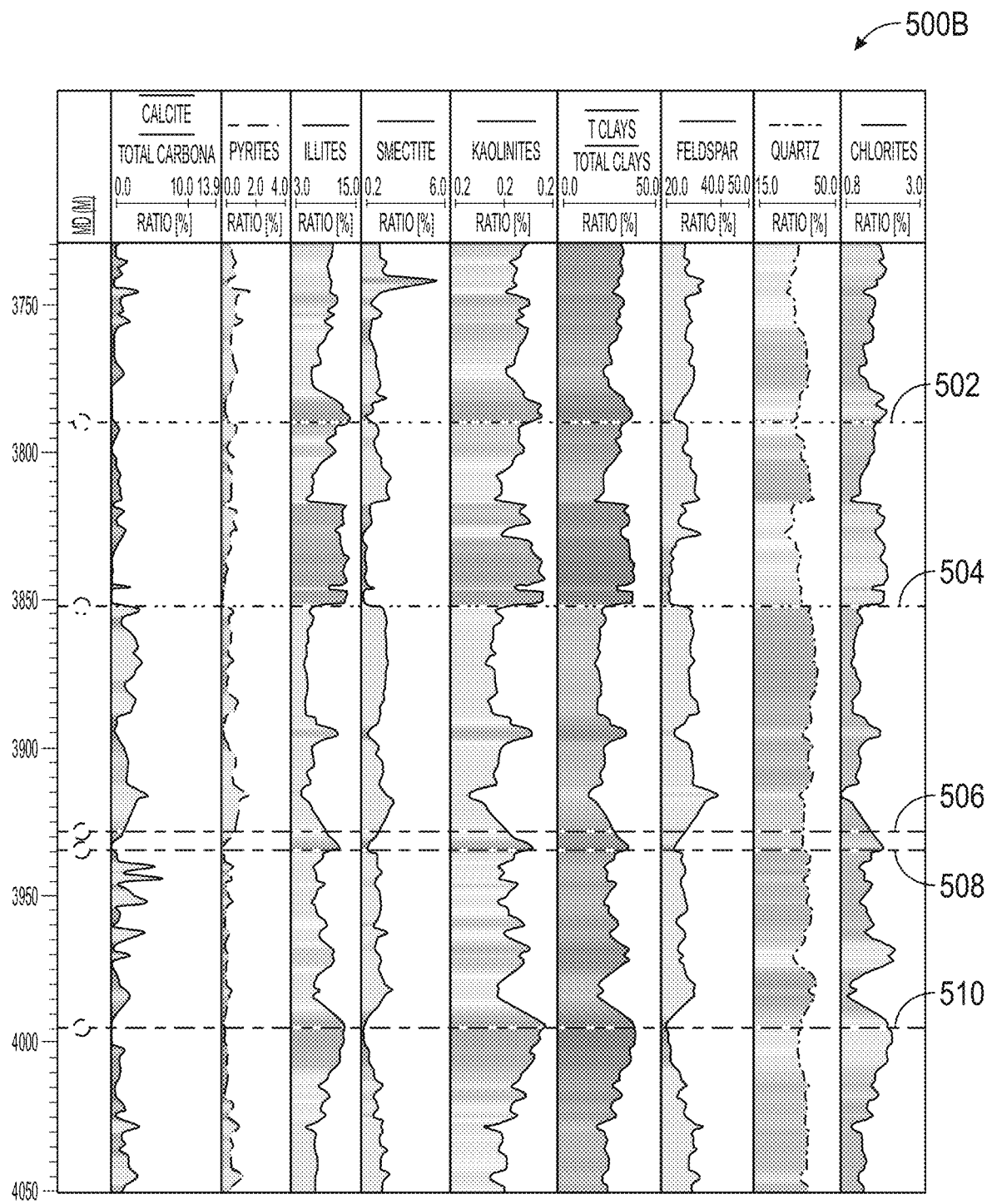
FIG. 5B illustrates enlarged portions of the schematic plot of FIG. 5A.
Figure 5C:
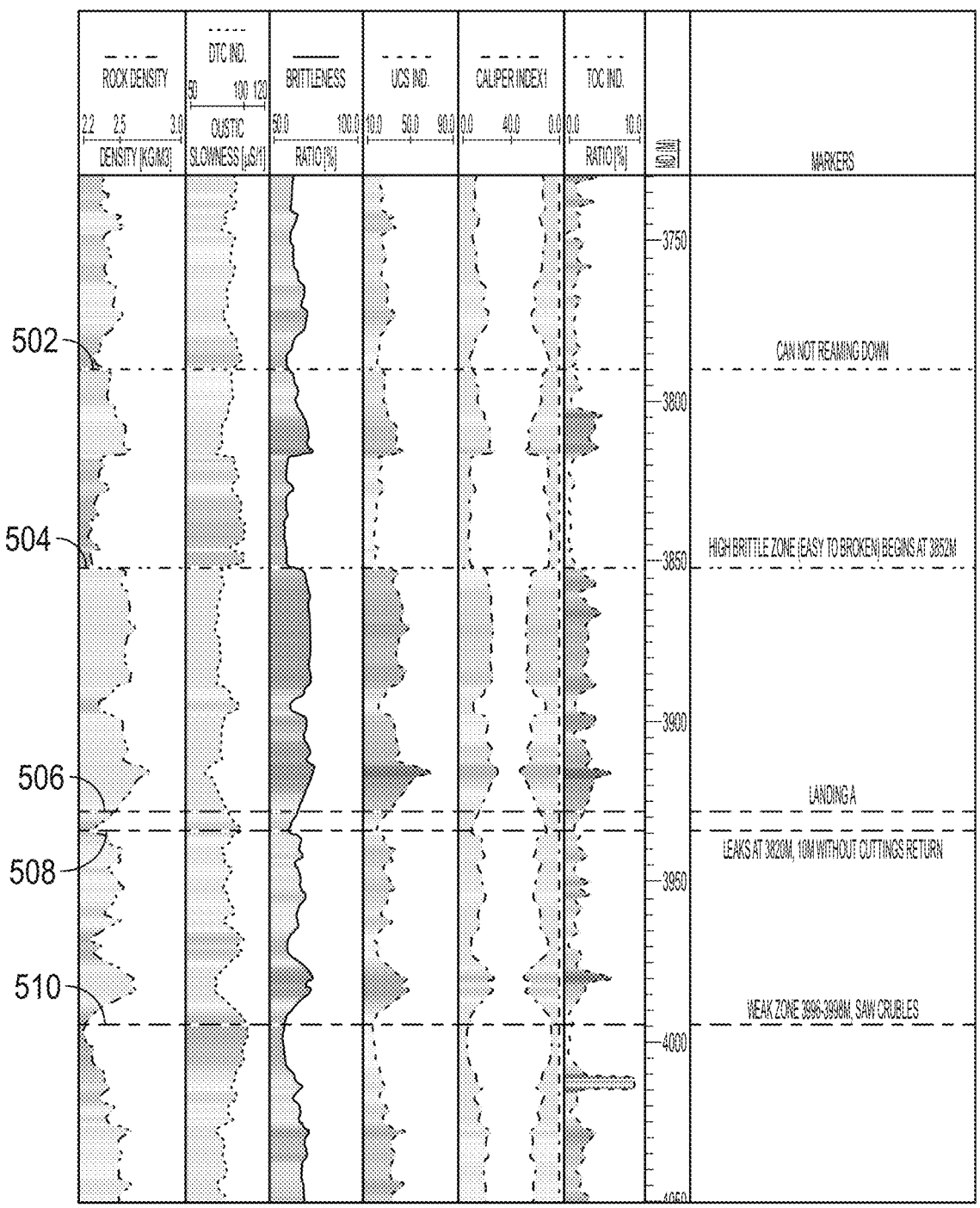
FIG. 5C illustrates enlarged portions of the schematic plot of FIG. 5A.
Figure 5D:
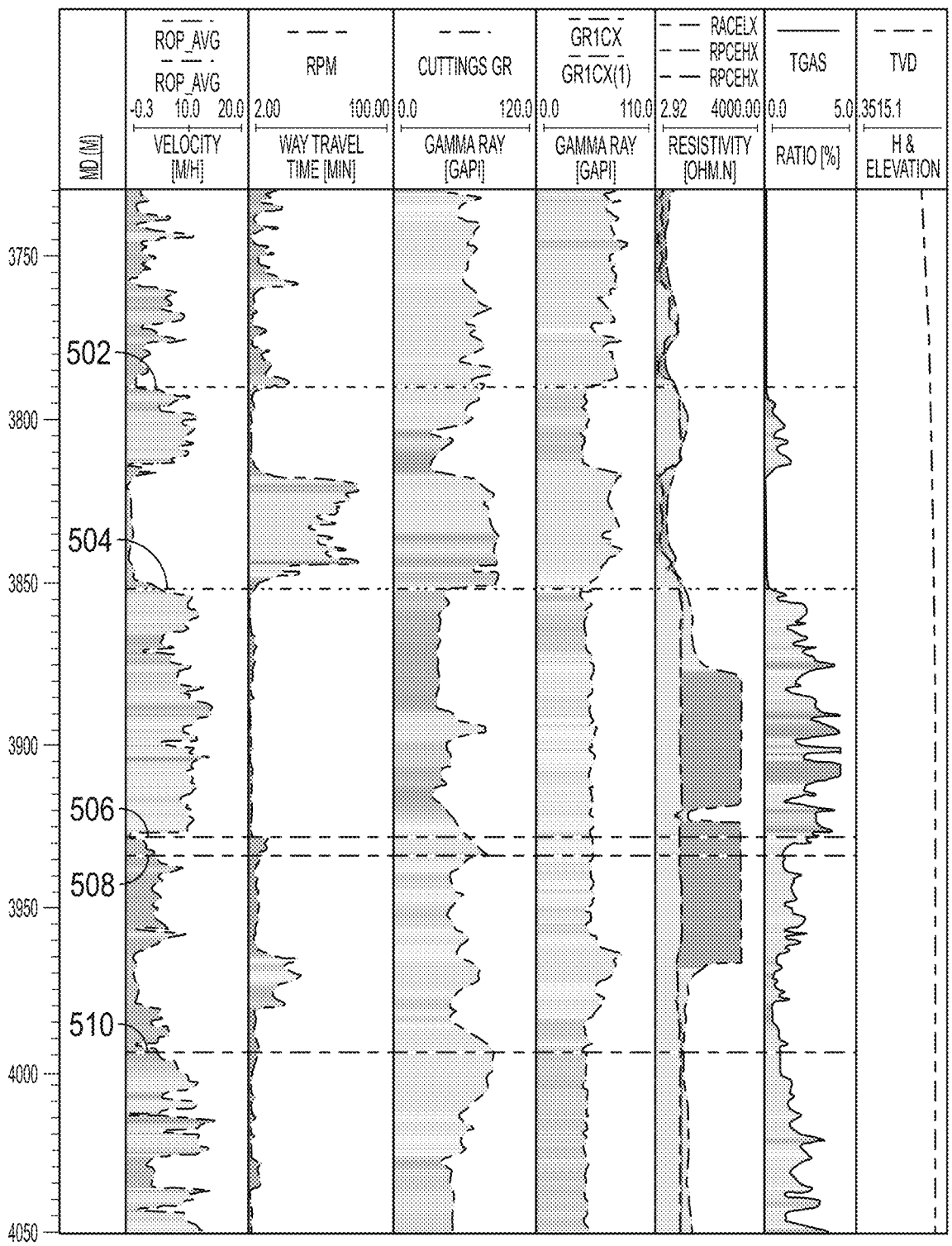
FIG. 5D illustrates enlarged portions of the schematic plot of FIG. 5A.
Figure 6A:
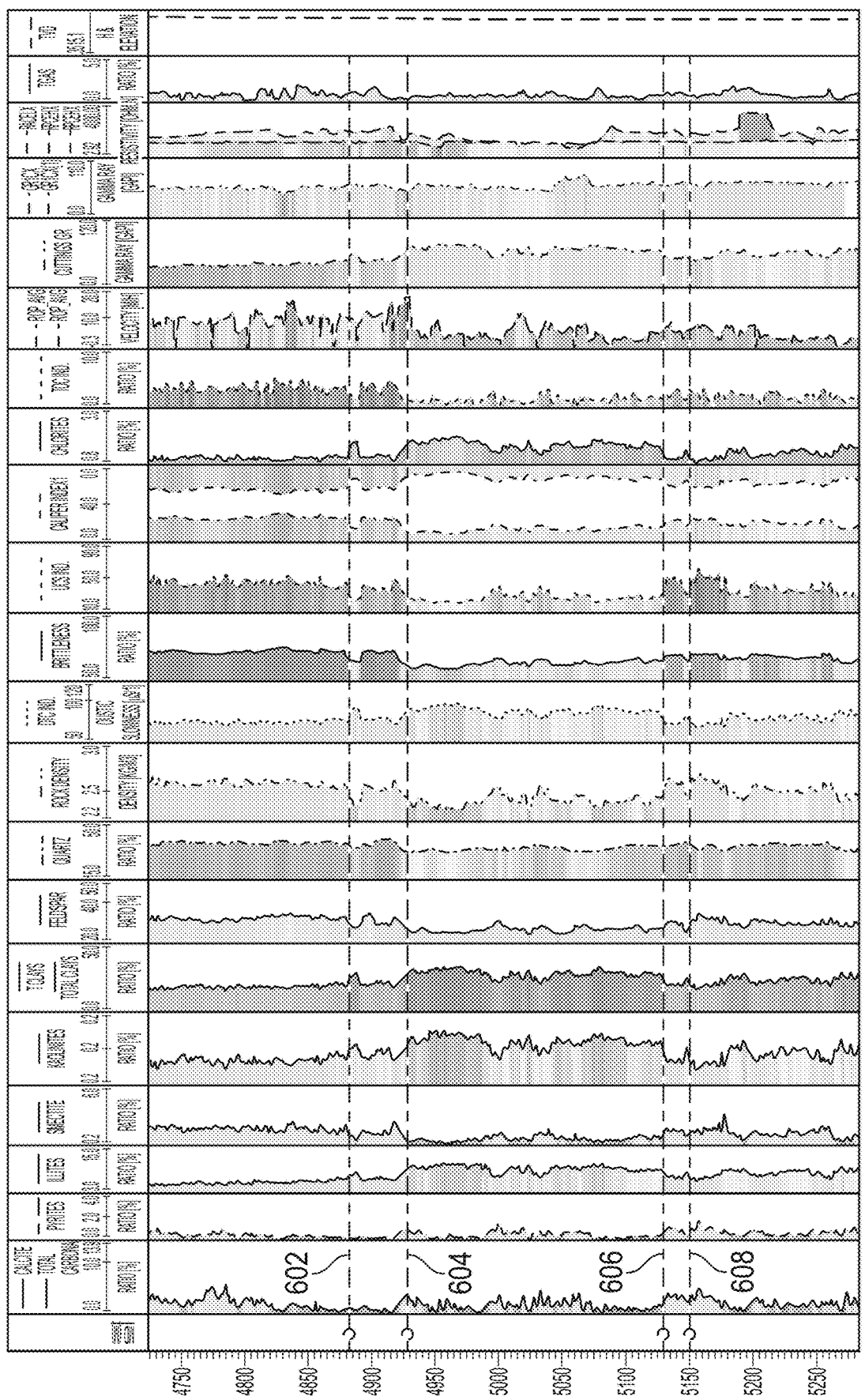
FIG. 6A is a schematic plot of displayed data obtained in accordance with an embodiment of the present disclosure.
Figure 6B:
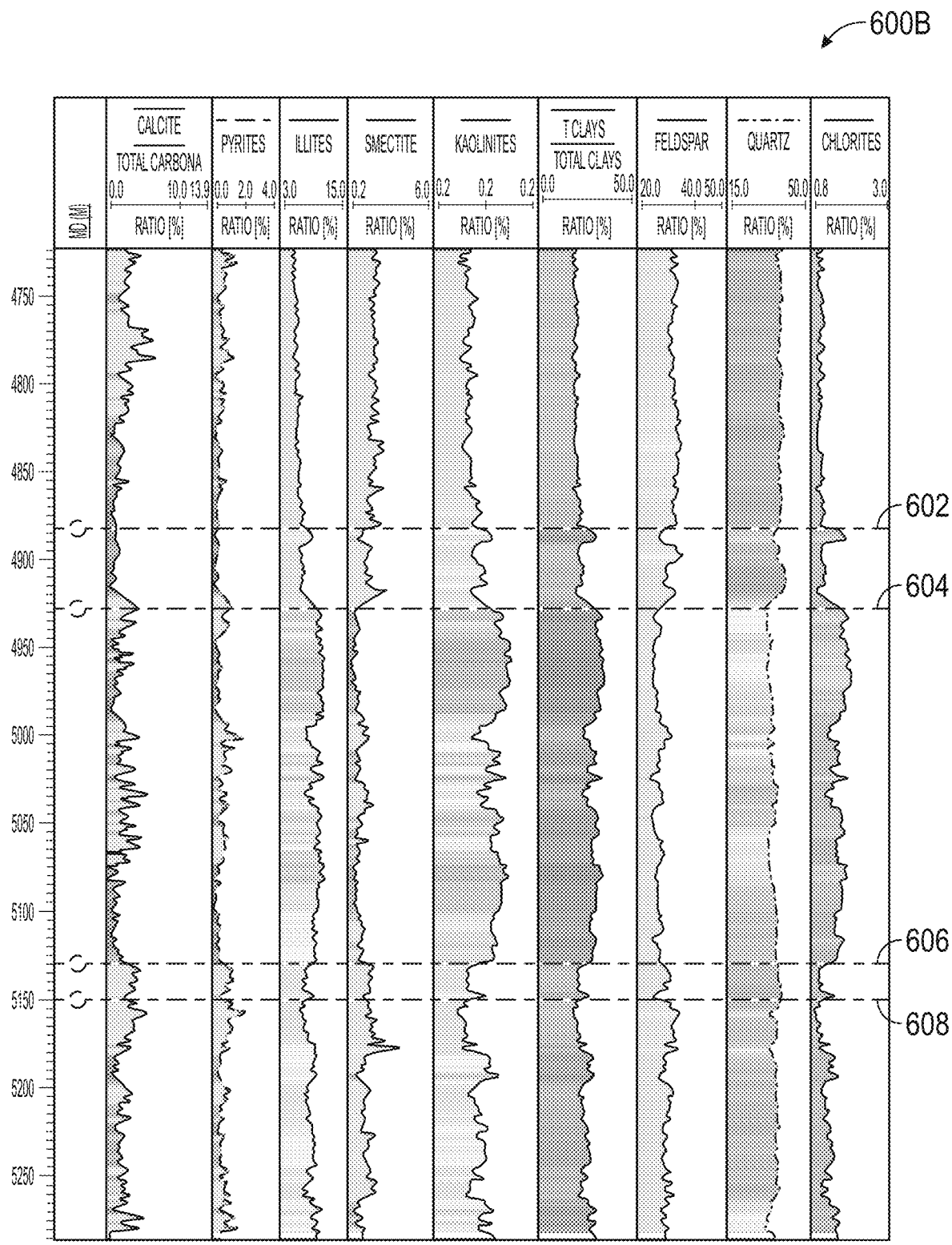
FIG. 6B illustrates enlarged portions of the schematic plot of FIG. 6A.
Figure 6C:
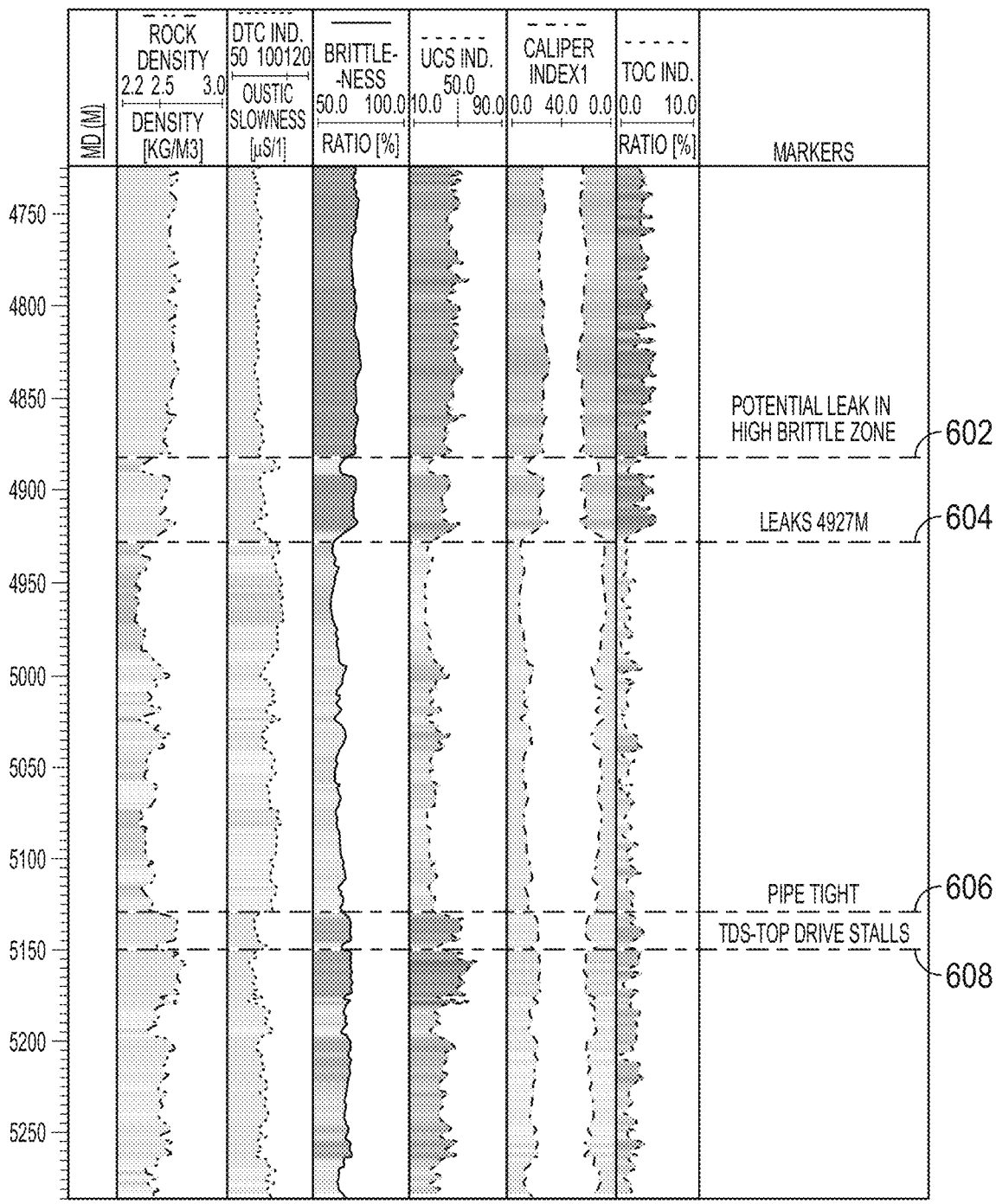
FIG. 6C illustrates enlarged portions of the schematic plot of FIG. 6A.
Figure 6D:
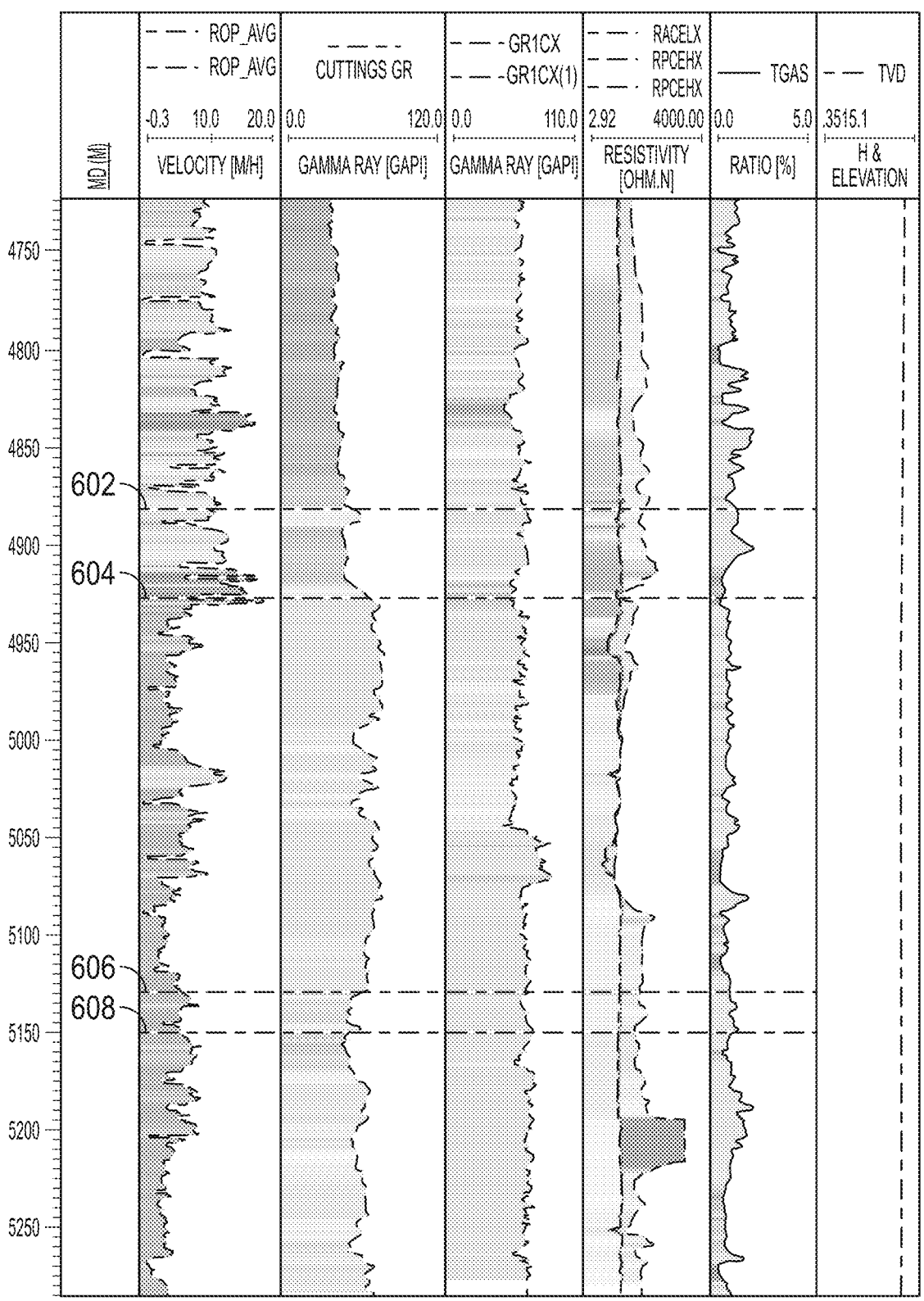
FIG. 6D illustrates enlarged portions of the schematic plot of FIG. 6A.

Turning now to FIGS. 5A-5D and FIGS. 6A-6D, example plots and data obtained from the above described processes as employed during a drilling operation in accordance with embodiments of the present disclosure are shown. FIG. 5A illustrates plot 500A that is illustrative of various petrophysics data obtained as described above, with FIGS. 5B, 5C, 5D illustrating enlarged detail plots 500B, 500C, 500D, respectively, of portions of the plot 500A. The plots 500A-500D are representative of a first well, and along an example interval from about 3725 m depth to about 4050 m depth. FIG. 6A illustrates plot 600A that is illustrative of various petrophysics data obtained as described above, with FIGS. 6B, 6C, 6D illustrating enlarged detail plots 600B, 600C, 600D, respectively, of portions of the plot 600A. The plots 600A-600D are representative of a first well, and along an example interval from about 4750 m depth to about 5250 m depth.

With reference to FIGS. 5A-5D and 6A-6D, plots 500D, 600B include data plotted with respect to depth associated with various mineral content derivations (e.g., calcite, total carbonates, pyrites, illites, smectics, kaolinites, total clay, feldspar, quartz, and chlorites). Plots 500C, 600C include various petrophysics data with respect to depth, as obtained from the processes described above (e.g., rock density, DTC, brittleness, UCS, caliper, TOC). Plots 500D, 600D include various drilling parameters with respect to depth (e.g., ROP, RPM, Cuttings gamma, RACE/RPCE, GR1CX, TGAS, and total vertical depth).

In the plots 500A-500D of FIGS. 5A-5DC, certain events or markers are identified. For example, at marker 502, reaming cannot be performed; at marker 504, a brittle zone is identified, which indicates easy to break formation; at marker 506 a landing is identified; at marker 508 leaks are identified, without cuttings return; and at marker 510 a weak zone is identified. The identification of these points/events is based on analysis of all of the aggregated data, as obtained from employed embodiments of the present disclosure.

In plots 600A-600D of FIGS. 6A-6D, certain events or markers are identified. For example, at marker 602 a potential leak in a high brittle zone is identified; at marker 604 leaks are identified; at marker 606 a tight pipe event is identified; and at marker 608 a stall of a top drive is identified. The identification of these points/events is based on analysis of all of the aggregated data, as obtained from employed embodiments of the present disclosure. The information provided at marker 604 is indicative of drilling fluid leaks which may have resulted from a change in the formation rock petrophysics properties. Further, at marker 608 illustrates why the top drive may have stalled. The data along marker 608 indicates that a clay filled fracture in a high brittle zone may have caused a drilling bit to drop into a "slot" or other natural fracture.

The plots 500A-500D and 600A-600D illustrate the value of some embodiments of the present disclosure, which illustrate the advantage of obtaining rock petrophysics data during drilling operations. It is noted that the plots are generated in real-time or near real-time during a drilling operation, and thus the full plots illustrated may only be obtained in totality after a drilling operation has exceed the lowest indicated depth. As noted above, very specific events and analysis of such events may be readily ascertained in real-time or near real-time. Such analysis allows for significantly less downtime of a drilling rig or drilling operation and can further improve a drilling efficiency, with knowledge of the formation and the rock petrophysics at given depths.

The plots 500A-500D and 600A-600D may be displayed on a surface-based display (e.g., at a rig or rig-site) such that a human operator may be able to visually see the active data collection and the correspondence between the different data sets obtained during the drilling operation. From this visualization, an operator may be able to make better informed decisions in a real-time manner, as compared to prior systems. Furthermore, the amount of data that may be visualized can far exceed prior systems. In some embodiments, the data collected may be automatically processed such that real-time or near real-time automated responses may be executed without human intervention. That is, because the data sets that are obtained from embodiments of the present disclosure are broad and inclusive of rock petrophysics, automated processes may be implemented based on the actively collected surface-based cuttings analysis. Such automated processes may include adjustments to drilling operations including, without limitation, changing weight-on-bottom, rate of penetration, revolutions per minute, halting drilling, and/or triggering alarms to notify human operators that action may be required based on the collected datasets.

The combination of the element/mineral data and the rock physics data can be displayed using a surface display device in depth-based logs, and may be analyzed similar to wireline logs (but these are obtained at the surface and no wireline tool is run downhole). Further, such data and information can enable and be used in finite element analysis and modeling, reservoir navigation services and/or geosteering, bit performance, and/or fracture modeling and interval identification.

In accordance with some embodiments of the present disclosure, formation evaluation techniques are provided that enable the building of a quantitative model of "sweetspot fracable zone" for shale. Such "sweetspot" determination and modeling can enable accurate and/or precise landing and targeting of fracturing operations in the most prospective or viable zones along a borehole. As described above, the quantitative data is obtained through measurement of cuttings samples at a well-site. The quantitative and initial data is XRF data obtained on-site during a drilling operation. For example, a field-portable XRF equipment system may be used to generate elemental and mineralogical composition data of one or more cuttings samples. From this data, rock petrophysical data may be obtained, as described above.

Advantageously, in accordance with some embodiments of the present disclosure, a relatively fast analysis is provided to enable enhanced reservoir navigation. For example, such enhanced reservoir navigation may include maintaining a well trajectory within a predefined sweetspot fracable zone. Identifying the sweetspot fracable zone while-drilling is an advantage of prior systems, such as wireline systems. To enable such enhanced reservoir navigation, embodiments of the present disclosure provide for precise formation evaluation information to keep the wellbore staying within a desirable zone.

Embodiments of the present disclosure enable characterizing of a zone with carbonates, clay types, quartz, rock strength, and DTC at the wellsite, in a real-time manner (i.e., during a drilling operation). To evaluate source rock, an operator may use cutting-based information as obtained from processes described herein. For example, TOC Index, Mobile HC, Th/U, Cuttings-based Inorganic Gamma may all be obtained in real-time or near real-time. Furthermore, to evaluate facability, an operator can employ the cuttings-based petrophysical data obtained in accordance with embodiments of the present disclosure. For example, UCS—rock strength, DTC, brittleness, density, as well as mineralogy, like quartz and clay types may all be derived in accordance with embodiments of the present disclosure, and enable determinations of fracability. The clay types and their magnitudes from XRF cuttings-based analysis may be useful to optimize fracture fluids, via a clay swelling and clay expansion analysis. These types of clay minerals are very sensitive to fracture fluids, and hence effective permeability. The data generated during the drilling process can also be used both during and after reaching total depth to generate optimized fracturing stage and perforation design, aiming to further maximize well productivity.

As discussed above, embodiments of the present disclosure are directed to improved methods for obtaining wireline (downhole) data at the surface. That is, by using XRF/XRD to obtain surface-based data, additional downhole properties (e.g., rock petrophysics) may be extracted to a level that is on par with wireline datasets. During a drilling operation, a single cutting sample may be obtained and XRF and XRD analysis may be performed thereon. From this information, additional rock properties may be extracted, thus enabling surface-based datasets that are analogous to wireline datasets, without the costs and risks associated with running wireline tools.

As described above, embodiments of the present disclosure can enable defining a "sweet spot" in a formation for fracing (e.g., shale gas) while-drilling. Furthermore, embodiments of the present disclosure enable characterizing a reservoir to understand why various drilling events occur. For example, breakout, losses, drilling deficiencies, higher vibration than expected, etc. may all be informed from the data obtained from embodiments of the present disclosure. The data obtained while-drilling at the surface, in accordance with embodiments of the present disclosure, can inform a drilling operation to change how to drill or tackle a given formation. For example, by known downhole petrophysics properties, as described herein, an operator can make determinations regarding bit properties, adjust geo-steering operations, etc. Furthermore, knowledge regarding relatively difficult sections and/or locations of drilling may be provided and thus inform an operator regarding risks and performing a drilling operation in a given manner.

Furthermore, the real-time or near real-time data acquisition, as provided by embodiments of the present disclosure, enables prompt and early/efficient decision making. For example, the surface-based cuttings data analysis provided in accordance with embodiments of the present disclosure can assists operators to refine models and understanding of reservoir characterization as well as define a potential cause map for why certain drilling events may have occurred. Higher or lower vibration stick slip (VSS) than expected, damage to cutting structure (e.g., bit), excess wear, higher or lower rates of penetration (ROP) than expected, pipe stick, etc. It will be appreciated that embodiments of the present disclosure can eliminate the need to run acoustic LWD tools and/or prevent or avoid drilling in an area that is geomechanically challenging.

While embodiments described herein have been described with reference to specific figures, it will be understood that various changes may be made and equivalents may be substituted for elements thereof without departing from the scope of the present disclosure. In addition, many modifications will be appreciated to adapt a particular instrument, situation, or material to the teachings of the present disclosure without departing from the scope thereof. Therefore, it is intended that the disclosure not be limited to the particular embodiments disclosed, but that the present disclosure will include all embodiments falling within the scope of the appended claims or the following description of possible embodiments.

Embodiment 1: A drilling process method comprising: performing a drilling operation through a downhole formation, the drilling operation generating drilling cuttings; obtaining a single drilling cuttings sample at a surface-based location; performing x-ray diffraction (XRD) and x-ray fluorescence (XRF) analysis on the single drilling cuttings sample; obtaining element information of the single drilling cuttings sample from the XRF analysis regarding the downhole formation; obtaining mineral information of the single drilling cuttings sample from at least one of the XRD and the XRF analysis regarding the downhole formation; and determining at least one rock petrophysics property of the downhole formation from the element information and the mineral information.

Embodiment 2: The method according to any preceding embodiment, wherein the at least one rock petrophysics property includes one or more of cuttings gamma, cuttings-based mobile hydrocarbon, cuttings mineral-based density, cuttings-based bulk DTC, caliper index, cuttings-based bulk porosity, and unconfined compressive strength.

Embodiment 3: The method according to any preceding embodiment, wherein the at least one rock petrophysics property includes a cuttings gamma obtained from:

$$GR_{cutting} = A \frac{U_\% * U_r + Th_\% * Th_r + K_\% * K_r}{B * C},$$

wherein $GR_{cutting}$ is the cutting gamma, U % is a percent of uranium within the single drilling cuttings sample, $U_r$ is an elemental radiation from uranium of the single drilling cuttings sample, Th % is a percent of thorium within the single drilling cuttings sample, $Th_r$ is an elemental radiation from thorium of the single drilling cuttings sample, K % is a percent of potassium within the single drilling cuttings sample, and $K_r$ is an elemental radiation from potassium of the single drilling cuttings sample, and coefficients A, B, and C are obtained from core data correlation.

Embodiment 4: The method according to any preceding embodiment, wherein the at least one rock petrophysics property includes a cutting gamma and a mobile hydrocarbon, wherein the mobile hydrocarbon may be obtained using:

$$\text{Mobile } HC = \text{IF}\left(\frac{GR_{LWD} - GR_{cutting}}{GR_{LWD}} < 0\right), 0, \left(\frac{GR_{LWD} - GR_{cutting}}{GR_{LWD}}\right)\%,$$

wherein $GR_{LWD}$ is a gamma output based on logging-while-drilling data and $GR_{cutting}$ is the cutting gamma.

Embodiment 5: The method according to any preceding embodiment, wherein the at least one rock petrophysics property includes a cuttings mineral-based density obtained using:

$$\rho_{cutting} = \frac{M_1 * \rho_1 + M_2 * \rho_2 + M_3 * \rho_3 \ldots M_n * \rho_n}{A},$$

where $\rho_{cutting}$ is the cuttings mineral-based density, $M_1$ is an amount of a first mineral within the single drilling cuttings sample, $\rho_1$ is a density of the first mineral, $M_2$ is an amount of a second mineral within the single drilling cuttings sample, $\rho_2$ is a density of the second mineral, $M_3$ is an amount of a third mineral within the single drilling cuttings sample, $\rho_3$ is a density of the third mineral, $M_n$ is an amount of an nth mineral within the single drilling cuttings sample, $\rho_n$ is a density of the nth mineral, and A represents missing materials compared to a 100% density.

Embodiment 6: The method according to any preceding embodiment, wherein the at least one rock petrophysics property includes a cuttings-based bulk DTC obtained using: $DTC_{bulk}=(-DTC_{index2})*\rho_{cutting}*DTC_{index3}$ $DTC_{index1}$, where $DTC_{bulk}$ is the cuttings-based bulk DTC, $\rho_{cutting}$ is a cuttings mineral-based density, and $DTC_{index1}$, $DTC_{index2}$, and $DTC_{index3}$ are derived from a correlation model from cross-dipole logs.

Embodiment 7: The method according to any preceding embodiment, wherein the at least one rock petrophysics property includes a caliper index obtained using:

$$C_{index} = \rho_{cutting} * \left(-\ln\frac{100-B}{B}\right),$$

where $C_{index}$ is the caliper index, $\rho_{cutting}$ is a cuttings mineral-based density, and B is a brittleness of the formation.

Embodiment 8: The method according to any preceding embodiment, wherein the at least one rock petrophysics property includes a cuttings-based bulk porosity obtained using:

$$\phi_{bulk} = \frac{DTC_{bulk} - DTC_{ma}}{DTC_w - DTC_{ma}}/KCP,$$

where $\phi_{bulk}$ is the bulk porosity, $DTC_{bulk}$ is a cuttings-based bulk porosity, $DTC_{ma}$ is a sonic log reading in 100% matrix rock, $DTC_w$ is a sonic log reading in 100% water, and KCP is a compaction factor.

Embodiment 9: The method according to any preceding embodiment, wherein the at least one rock petrophysics property includes an unconfined compressive strength obtained from:

$$UCS = 1.2 * \left(\frac{1000}{A*DTC_{bulk}}\right)^4 + 60.5 * \left(\frac{1000}{A*DTC_{bulk}}\right)^2,$$

where UCS is the unconfined compressive strength, $DTC_{bulk}$ is a cuttings-based bulk porosity, and A is a lithology code.

Embodiment 10: The method according to any preceding embodiment, further comprising identifying fracture intervals of a formation based the element information, the mineral information, and the at least one rock petrophysics property.

Embodiment 11: The method according to any preceding embodiment, further comprising identifying a drilling event based on the element information, the mineral information, and the at least one rock petrophysics property.

Embodiment 12: The method according to any preceding embodiment, wherein the drilling event is at least one of a stuck pipe and damage to a bit.

Embodiment 13: A drilling system comprising: a drilling rig comprising a drill string having a bit on an end thereof for drilling a borehole through a formation; a surface-based cuttings collection device configured to obtain a single drilling cuttings sample; a cuttings analysis unit for performing at least one of x-ray diffraction (XRD) and x-ray fluorescence (XRF) analysis on the single drilling cuttings sample; and a processing system configured to: obtain element information of the single drilling cuttings sample from the XRF analysis regarding the downhole formation; obtain mineral information of the single drilling cuttings sample from at least one of the XRD and the XRF analysis regarding the downhole formation; and determine at least one rock petrophysics property of the downhole formation from the element information and the mineral information.

Embodiment 14: The system according to any preceding embodiment, wherein the at least one rock petrophysics property includes one or more of cuttings gamma, cuttings-based mobile hydrocarbon, cuttings mineral-based density, cuttings-based bulk DTC, caliper index, cuttings-based bulk porosity, and unconfined compressive strength.

Embodiment 15: The system according to any preceding embodiment, wherein the at least one rock petrophysics property includes a cuttings gamma obtained from:

$$GR_{cutting} = A\frac{U_\% * U_r + Th_\% * Th_r + K_\% * K_r}{B*C},$$

wherein $GR_{cutting}$ is the cutting gamma, U % is a percent of uranium within the single drilling cuttings sample, $U_r$ is an elemental radiation from uranium of the single drilling cuttings sample, Th % is a percent of thorium within the single drilling cuttings sample, $Th_r$ is an elemental radiation from thorium of the single drilling cuttings sample, K % is a percent of potassium within the single drilling cuttings sample, and $K_r$ is an elemental radiation from potassium of the single drilling cuttings sample, and coefficients A, B, and C are obtained from core data correlation.

Embodiment 16: The system according to any preceding embodiment, wherein the at least one rock petrophysics property includes a cutting gamma and a mobile hydrocarbon, wherein the mobile hydrocarbon may be obtained using:

$$\text{Mobile } HC = \text{IF}\left(\frac{GR_{LWD} - GR_{cutting}}{GR_{LWD}} < 0\right), 0, \left(\frac{GR_{LWD} - GR_{cutting}}{GR_{LWD}}\right)\%,$$

wherein $GR_{LWD}$ is a gamma output based on logging-while-drilling data and $GR_{cutting}$ is the cutting gamma.

Embodiment 17: The system according to any preceding embodiment, wherein the at least one rock petrophysics property includes a cuttings mineral-based density obtained using:

$$\rho_{cutting} = \frac{M_1 * \rho_1 + M_2 * \rho_2 + M_3 * \rho_3 \ldots M_n * \rho_n}{A},$$

where $\rho_{cutting}$ is the cuttings mineral-based density, $M_1$ is an amount of a first mineral within the single drilling cuttings sample, $\rho_1$ is a density of the first mineral, $M_2$ is an amount of a second mineral within the single drilling cuttings sample, $\rho_2$ is a density of the second mineral, $M_3$ is an amount of a third mineral within the single drilling cuttings sample, $\rho_3$ is a density of the third mineral, $M_n$, is an amount of an nth mineral within the single drilling cuttings sample, $\rho_n$, is a density of the nth mineral, and A represents missing materials compared to a 100% density.

Embodiment 18: The system according to any preceding embodiment, wherein the at least one rock petrophysics property includes cuttings-based bulk DTC obtained using: $DCT_{bulk}=(-DCT_{index2})*\rho_{cutting}*DTC_{index3}+DTC_{index1}$, where $DTC_{bulk}$ is the cuttings-based bulk DTC, $\rho_{cutting}$ is a cuttings mineral-based density, and $DTC_{index1}$, $DTC_{index2}$, and $DTC_{index3}$ are derived from a correlation model from cross-dipole logs.

Embodiment 19: The system according to any preceding embodiment, wherein the at least one rock petrophysics property includes a caliper index obtained using:

$$C_{index} = \rho_{cutting} * \left(-\ln\frac{100-B}{B}\right),$$

where $C_{index}$ is the caliper index, $\rho_{cutting}$ is a cuttings mineral-based density, and B is a brittleness of the formation.

Embodiment 20: The system according to any preceding embodiment, wherein the at least one rock petrophysics property includes cuttings-based bulk porosity obtained using:

$$\phi_{bulk} = \frac{DCT_{bulk} - DCT_{ma}}{DCT_w - DCT_{ma}}/KCP,$$

where $\phi_{bulk}$, is the bulk porosity, $DTC_{bulk}$ is a cuttings-based bulk porosity, $DTC_{ma}$ includes a sonic log reading in 100% matrix rock, $DTC_w$, is a sonic log reading in 100% water, and KCP is a compaction factor.

Embodiment 21: The system according to any preceding embodiment, wherein the at least one rock petrophysics property includes and unconfined compressive strength obtained from:

$$UCS = 1.2 * \left(\frac{1000}{A*DTC_{bulk}}\right)^4 + 60.5 * \left(\frac{1000}{A*DTC_{bulk}}\right)^2,$$

where UCS is the unconfined compressive strength, $DTC_{bulk}$ is a cuttings-based bulk porosity, and A is a lithology code.

In support of the teachings herein, various analysis components may be used including a digital and/or an analog system. For example, controllers, computer processing systems, and/or geo-steering systems as provided herein and/or used with embodiments described herein may include digital and/or analog systems. The systems may have components such as processors, storage media, memory, inputs, outputs, communications links (e.g., wired, wireless, optical, or other), user interfaces, software programs, signal processors (e.g., digital or analog) and other such components (e.g., such as resistors, capacitors, inductors, and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (e.g., ROMs, RAMs), optical (e.g., CD-ROMs), or magnetic (e.g., disks, hard drives), or any other type that when executed causes a computer to implement the methods and/or processes described herein. These instructions may provide for equipment operation, control, data collection, analysis and other functions deemed relevant by a system designer, owner, user, or other such personnel, in addition to the functions described in this disclosure. Processed data, such as a result of an implemented method, may be transmitted as a signal via a processor output interface to a signal receiving device. The signal receiving device may be a display monitor or printer for presenting the result to a user. Alternatively, or in addition, the signal receiving device may be memory or a storage medium. It will be appreciated that storing the result in memory or the storage medium may transform the memory or storage medium into a new state (i.e., containing the result) from a prior state (i.e., not containing the result). Further, in some embodiments, an alert signal may be transmitted from the processor to a user interface if the result exceeds a threshold value.

Furthermore, various other components may be included and called upon for providing for aspects of the teachings herein. For example, a sensor, transmitter, receiver, transceiver, antenna, controller, optical unit, electrical unit, and/or electromechanical unit may be included in support of the various aspects discussed herein or in support of other functions beyond this disclosure.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the present disclosure.

The teachings of the present disclosure may be used in a variety of well operations. These operations may involve using one or more treatment agents to treat a formation, the fluids resident in a formation, a borehole, and/or equipment in the borehole, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While embodiments described herein have been described with reference to various embodiments, it will be understood that various changes may be made and equivalents may be substituted for elements thereof without departing from the scope of the present disclosure. In addition, many modifications will be appreciated to adapt a particular instrument, situation, or material to the teachings of the present disclosure without departing from the scope thereof. Therefore, it is intended that the disclosure not be limited to the particular embodiments disclosed as the best mode contemplated for carrying the described features, but that the present disclosure will include all embodiments falling within the scope of the appended claims.

Accordingly, embodiments of the present disclosure are not to be seen as limited by the foregoing description, but are only limited by the scope of the appended claims.

What is claimed:

1. A drilling process method comprising:
   performing a drilling operation through a downhole formation, the drilling operation generating drilling cuttings of the downhole formation;
   obtaining a drilling cuttings sample at a surface-based location;
   performing at least one of x-ray diffraction (XRD) and x-ray fluorescence (XRF) analysis on the drilling cuttings sample;
   obtaining element information of the drilling cuttings sample from at least one of the XRD analysis and the XRF analysis;
   obtaining mineral information of the drilling cuttings sample from at least one of the XRD analysis and the XRF analysis;
   determining a cuttings mineral-based density using the element information and the mineral information; and
   determining a cuttings-based bulk sonic travel time using the determined cuttings mineral-based density,
   wherein the cuttings mineral-based density is obtained using:

$$\rho_{cutting} = \frac{M_1 * \rho_1 + M_2 * \rho_2 + M_3 * \rho_3 \ldots M_n * \rho_n}{A}$$

where $\rho_{cutting}$ is the cuttings mineral-based density, $M_1$ is an amount of a first mineral within the drilling cuttings sample, $\rho_1$ is a density of the first mineral, $M_2$ is an amount of a second mineral within the drilling cuttings sample, $\rho_2$ is a density of the second mineral, $M_3$ is an amount of a third mineral within the drilling cuttings sample, $\rho_3$ is a density of the third mineral, $M_n$ is an amount of an nth mineral within the drilling cuttings sample, $\rho_n$ is a density of the nth mineral, and A represents missing materials compared to a 100% density.

2. The method of claim 1, further comprising determining a cuttings-based bulk porosity using the determined cuttings-based bulk sonic travel time.

3. The method of claim 1, wherein the cuttings-based bulk sonic travel time is obtained using:

$$DCT_{bulk} = (-DCT_{index2}) * \rho_{cutting} * DTC_{index3} + DTC_{index1}$$

where $DTC_{bulk}$ is the cuttings-based bulk sonic travel time, $\rho_{cutting}$ is the cuttings mineral-based density, and $DTC_{index1}$, $DTC_{index2}$, and $DTC_{index3}$ are derived from a correlation model from cross-dipole logs.

4. The method of claim 1, further comprising determining a caliper index using the cuttings mineral-based density, the caliper index is obtained using:

$$C_{index} = \rho_{cutting} * \left(-\ln \frac{100-B}{B}\right)$$

where $C_{index}$ is the caliper index, $\rho_{cutting}$ is the cuttings mineral-based density, and B is a brittleness of the formation.

5. The method of claim 2, wherein the cuttings-based bulk porosity is obtained using:

$$\phi_{bulk} = \frac{DCT_{bulk} - DCT_{ma}}{DCT_w - DCT_{ma}} / KCP$$

where $\phi_{bulk}$ is the cuttings-based bulk porosity, $DTC_{bulk}$ is the cuttings-based bulk sonic travel time, $DTC_{ma}$ is a 100%-matrix rock sonic travel time, $DTC_w$ is a 100%-water sonic travel time, and KCP is a compaction factor.

6. The method of claim 1, further comprising determining an unconfined compressive strength using the cuttings-based bulk sonic travel time, the unconfined compressive strength is obtained from:

$$UCS = 1.2 * \left(\frac{1000}{A * DTC_{bulk}}\right)^4 + 60.5 * \left(\frac{1000}{A * DTC_{bulk}}\right)^2$$

where UCS is the unconfined compressive strength, $DTC_{bulk}$ is the cuttings-based bulk sonic travel time, and A is a lithology code.

7. The method of claim 1, further comprising identifying fracture intervals of a formation based on at least one of the cuttings mineral-based density and the cuttings-based bulk sonic travel time.

8. The method of claim 1, further comprising identifying a drilling event based on at least one of the cuttings mineral-based density and the cuttings-based bulk sonic travel time.

9. The method of claim 8, wherein the drilling event is at least one of a stuck pipe and damage to a bit.

10. A drilling system comprising:
    a drilling rig comprising a drill string having a bit on an end thereof for drilling a borehole through a downhole formation;
    a surface-based cuttings collection device configured to obtain a drilling cuttings sample of the downhole formation;
    a cuttings analysis unit for performing at least one of x-ray diffraction (XRD) analysis and x-ray fluorescence (XRF) analysis on the drilling cuttings sample; and
    a processing system configured to:
    obtain element information of the drilling cuttings sample from at least one of the XRD analysis and the XRF analysis;
    obtain mineral information of the drilling cuttings sample from at least one of the XRD analysis and the XRF analysis;
    determine cuttings mineral-based density using the element information and the mineral information; and
    determine cuttings-based bulk sonic travel time using the determined cuttings mineral-based density,
    wherein the cuttings-based bulk sonic travel time is obtained using:

$$DCT_{bulk} = 1 * (-DCT_{index2}) * \rho_{cutting} * DTC_{index3} + DTC_{index1}$$

where $DTC_{bulk}$ is the cuttings-based bulk sonic travel time, $\rho_{cutting}$ is the cuttings mineral-based density, and $DTC_{index1}$, $DTC_{index2}$, and $DTC_{index3}$ are derived from a correlation model from cross-dipole logs.

11. The system of claim 10, further comprising determining a cuttings-based bulk porosity using the determined cuttings-based bulk sonic travel time.

12. The system of claim 10, wherein the cuttings mineral-based density is obtained using:

$$\rho_{cutting} = \frac{M_1 * \rho_1 + M_2 * \rho_2 + M_3 * \rho_3 \ldots M_n * \rho_n}{A}$$

where $\rho_{cutting}$ is the cuttings mineral-based density, $M_1$ is an amount of a first mineral within the drilling cuttings sample, $\rho_1$ is a density of the first mineral, $M_2$ is an amount of a second mineral within the drilling cuttings sample, $\rho_2$ is a density of the second mineral, $M_3$ is an amount of a third mineral within the drilling cuttings sample, $\rho_3$ is a density of the third mineral, $M_n$ is an amount of an nth mineral within the drilling cuttings sample, $\rho_n$ is a density of the nth mineral, and A represents missing materials compared to a 100% density.

13. The system of claim 10, further comprising determining a caliper index using the cuttings mineral-based density, the caliper index is obtained using:

$$C_{index} = = \rho_{cutting}\left(-\ln\frac{100-B}{B}\right)$$

where $C_{index}$ is the caliper index, $\rho_{cutting}$ is the cuttings mineral-based density, and B is a brittleness of the downhole formation.

14. The system of claim 11, wherein the cuttings-based bulk porosity is obtained using:

$$\phi_{bulk} = \frac{DCT_{bulk} - DCT_{ma}}{DCT_w - DCT_{ma}}/KCP$$

where $\phi_{bulk}$ is the cuttings-based bulk porosity, $DTC_{bulk}$ is the cuttings-based bulk sonic travel time, $DTC_{ma}$ is a 100%-matrix rock sonic travel time, $DTC_w$ is a 100%-water sonic travel time, and KCP is a compaction factor.

15. The system of claim 10, further comprising determining an unconfined compressive strength using the cuttings-based bulk sonic travel time, the unconfined compressive strength is obtained from:

$$UCS = 1.2*\left(\frac{1000}{A*DTC_{bulk}}\right)^4 + 60.5*\left(\frac{1000}{A*DTC_{bulk}}\right)^2$$

where UCS is the unconfined compressive strength, $DTC_{bulk}$ is the cuttings-based bulk sonic travel time, and A is a lithology code.

16. A drilling process method comprising:
performing a drilling operation through a downhole formation, the drilling operation generating drilling cuttings of the downhole formation;
obtaining a drilling cuttings sample at a surface-based location;
performing at least one of x-ray diffraction (XRD) analysis and x-ray fluorescence (XRF) analysis on the drilling cuttings sample;
obtaining element information of the drilling cuttings sample from at least one of the XRD analysis and the XRF analysis;
determining a cuttings gamma using the element information; and
determining a cuttings-based mobile hydrocarbon using the determined cuttings gamma,
wherein the cuttings gamma is obtained from:

$$GR_{cutting} = A\frac{U_\%*U_r + Th_\%*Th_r + K_\%*K_r}{B*C}$$

wherein $GR_{cutting}$ is the cutting gamma, U % is a percent of uranium within the drilling cuttings sample, $U_r$ is an elemental radiation from uranium of the drilling cuttings sample, Th % is a percent of thorium within the drilling cuttings sample, $Th_r$ is an elemental radiation from thorium of the drilling cuttings sample, K % is a percent of potassium within the drilling cuttings sample, $K_r$ is an elemental radiation from potassium of the drilling cuttings sample, and coefficients A, B, and C are obtained from core data correlation.

17. The method of claim 1, further comprising adjusting a geosteering operation using at least one of the determined cuttings mineral-based density and the determined cuttings-based bulk sonic travel time.

18. The method of claim 16, wherein the cuttings-based mobile hydrocarbon (Mobile HC) may be obtained using:

$$\text{Mobile } HC = \text{IF}\left(\frac{GR_{LWD} - GR_{cutting}}{GR_{LWD}} < 0\right), 0, \left(\frac{GR_{LWD} - GR_{cutting}}{GR_{LWD}}\right)\%$$

wherein $GR_{LWD}$ is a gamma output based on logging-while-drilling data and $GR_{cutting}$ is the cutting gamma.

* * * * *